(12) United States Patent
Yanai

(10) Patent No.: US 10,816,711 B2
(45) Date of Patent: Oct. 27, 2020

(54) OPTICAL DEVICE AND DISPLAY DEVICE

(71) Applicant: FUJIFILM Corporation, Tokyo (JP)

(72) Inventor: Yujiro Yanai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 27 days.

(21) Appl. No.: 16/235,480

(22) Filed: Dec. 28, 2018

(65) Prior Publication Data
US 2019/0154896 A1 May 23, 2019

Related U.S. Application Data

(63) Continuation of application No. PCT/JP2017/020170, filed on May 31, 2017.

(30) Foreign Application Priority Data

Jun. 30, 2016 (JP) .................................. 2016-130141

(51) Int. Cl.
*G02B 5/30* (2006.01)
*G09F 9/00* (2006.01)
(Continued)

(52) U.S. Cl.
CPC ......... *G02B 5/3025* (2013.01); *G02B 5/1833* (2013.01); *G02F 1/1335* (2013.01);
(Continued)

(58) Field of Classification Search
CPC ................ G02B 5/3025; G02B 5/1833; G02B 2207/123; G02F 1/133528; G02F 1/1335; G09F 9/00
(Continued)

(56) References Cited

U.S. PATENT DOCUMENTS

2006/0126156 A1 6/2006 Evans et al.
2007/0070501 A1* 3/2007 Wen et al. ........... G02B 27/286
359/489.07
(Continued)

FOREIGN PATENT DOCUMENTS

JP 2004-279866 A 10/2004
JP 2006-171728 A 6/2006
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2017/020170, dated Jan. 10, 2019, with English translation of the Written Opinion.
(Continued)

*Primary Examiner* — Charles S Chang
(74) *Attorney, Agent, or Firm* — Birch, Stewart, Kolasch & Birch, LLP

(57) ABSTRACT

An optical device includes a first polarizer which has an absorption axis in a thickness direction; a second polarizer which has an absorption axis in a thickness direction; and a functional layer which is disposed between the first polarizer and the second polarizer and is capable of switching between a state in which an in-plane retardation is 0 and a state in which an in-plane retardation is greater than 0. A display device includes a display element; and the optical device.

15 Claims, 9 Drawing Sheets

(51) Int. Cl.
*G02F 1/1335* (2006.01)
*G02B 5/18* (2006.01)

(52) U.S. Cl.
CPC ......... *G02F 1/133528* (2013.01); *G09F 9/00* (2013.01); *G02B 2207/123* (2013.01)

(58) Field of Classification Search
USPC ...................................................... 349/96–98
See application file for complete search history.

(56) References Cited

U.S. PATENT DOCUMENTS

| | | |
|---|---|---|
| 2007/0146608 A1 | 6/2007 | Jin et al. |
| 2009/0153783 A1 | 6/2009 | Umemoto |
| 2010/0092784 A1 | 4/2010 | Kamada et al. |
| 2010/0265433 A1 | 10/2010 | Hoshi |
| 2013/0329288 A1* | 12/2013 | Yim .......................... G02B 5/30 359/483.01 |
| 2016/0170110 A1* | 6/2016 | Pau et al. ................ C09K 19/38 356/364 |

FOREIGN PATENT DOCUMENTS

| | | |
|---|---|---|
| JP | 2007-178979 A | 7/2007 |
| JP | 2008-165201 A | 7/2008 |
| JP | 2009-145776 A | 7/2009 |
| WO | WO 2010/044414 A1 | 4/2010 |

OTHER PUBLICATIONS

International Search Report (Form PCT/ISA/210) for International Application No. PCT/JP2017/020170, dated Aug. 22, 2017, with English translation.

* cited by examiner

OPTICAL DEVICE AND DISPLAY DEVICE

CROSS-REFERENCE TO RELATED APPLICATIONS

This application is a Continuation of PCT International Application No. PCT/JP2017/020170 filed on May 31, 2017, which claims priority under 35 U.S.C. § 119(a) to Japanese Patent Application No. 2016-130141 filed on Jun. 30, 2016. Each of the above application(s) is hereby expressly incorporated by reference, in its entirety, into the present application.

BACKGROUND OF THE INVENTION

1. Field of the Invention

The present invention relates to an optical device used for a display device such as a liquid crystal display device and a display device using this optical device.

2. Description of the Related Art

In personal electronic devices, for example, tablet personal computers (PCs), notebook PCs, and mobile phones such as smartphones, there is a demand that users do not want their screens to be peeped by the surrounding third parties. Therefore, in these electronic devices, it has been attempted to narrow the viewing angle of a screen such that the surrounding third parties cannot peep at the screen.

For example, JP2008-165201A describes an optical film which includes a polarizing film on both surfaces of a retardation film such as a λ/2 plate and in which this polarizing film includes a polarizer, and an absorption axis of the polarizer is aligned in a direction substantially perpendicular to the film surface.

Since the polarizing film in this optical film has an absorption axis aligned in a direction substantially perpendicular to the film surface, incidence rays from an oblique direction with respect to the film surface can be drastically reduced. Therefore, the viewing angle of a display image can be narrowed by placing this optical film on a screen of a plasma display or a liquid crystal display to make a light shielding area using the oblique direction.

Meanwhile, in a case where this optical film is placed on the screen, the optical film is fixed thereto in a state in which the viewing angle from the oblique direction is narrow. Accordingly, in a case where an image is displayed again at a typical wide viewing angle, the optical film needs to be removed.

In other words, in a case of using this optical film, it is necessary that the optical film is detached from or attached onto the screen in order to switch between image display at a typical wide viewing angle and image display at a narrow viewing angle.

In addition, various display devices which are capable of switching between image display at a typical wide viewing angle and image display at a narrow viewing angle in order to ensure the security for preventing peeping from the side and to realize sufficient visibility from the side as necessary in electronic devices such as tablet PCs or notebook PCs have been suggested.

For example, JP2007-178979A discloses a liquid crystal display device including a first substrate which includes a gate wiring and a data wiring corresponding to red (R), green (G), blue (B), and white (W) subpixels; a thin film transistor which is disposed at the intersection of the gate wiring and the data wiring; a plate type first common electrode which is comprised in R, G, B, and W subpixels; a pixel electrode which is connected to the thin film transistor, is insulated from the first common electrode, and has a plurality of slits; a second substrate which is bonded to the first substrate in a state of facing the first substrate and comprises a liquid crystal layer in a space between the first substrate and the second substrate; and a plate type second common electrode which is formed on the second substrate so as to correspond to the W subpixel.

In a case of image display at a wide viewing angle in this liquid crystal display device, the W subpixel is driven in a fringe field switching (FFS) mode similar to the subpixels adjacent to R, G, and B subpixels so that the viewing angle is widened, and the W luminance is also compensated. In a case of image display at a narrow viewing angle, the W subpixel is driven in an electrically controlled birefringence (ECB) mode that enables formation of a vertical electric field, which is different from the subpixels adjacent to R, G, and B subpixels, and thus the viewing angle can be decreased.

Further, JP2004-279866A discloses a display device including a screen which has a viewing angle limited to one dimension direction; and image display switching means which switches between a personal view mode in which an erecting direction of an image to be displayed on this screen is substantially orthogonal to a limiting direction of the viewing angle and a multi view mode in which the erecting direction of the image coincides with the limiting direction of the viewing angle.

In other words, in this display device, it is possible to switch between image display at a wide viewing angle and image display at a narrow viewing angle depending on whether the top and the bottom of the image coincide with the limiting direction of the viewing angle or not by limiting the viewing angle of the screen to one dimension direction using a microprism sheet or the like and by rotating the image by 90°.

SUMMARY OF THE INVENTION

According to the display devices described in JP2007-178979A and JP2004-279866A, it is possible to switch between image display at a typical wide viewing angle and image display at a narrow viewing angle using one display device without attaching or detaching any member.

However, in the liquid crystal display device of JP2007-178979A, the configuration of the display device becomes complicated because the liquid crystal display element needs to have a special structure with W subpixels, a plurality of substrates, and a plurality of common electrodes and the liquid crystal display device needs to be driven in a plurality of different modes.

Further, in the display device of JP2004-279866A, extra image processing becomes necessary since the image needs to rotate by 90° in order to switch between display at a wide viewing angle and display at a narrow viewing angle. Further, since the aspect ratio of a screen varies in a typical display device, the aspect ratios of an image vary between display at a wide viewing angle and display at a narrow viewing angle in this display device.

An object of the present invention is to solve the above-described problems of the related art and to provide an optical device which has a simple configuration and is capable of switching between image display at a typical wide viewing angle and image display at a narrow viewing angle obtained by limiting the viewing angle with a simple operation without performing detachment and attachment nor performing image processing by being mounted on a tablet PC or a notebook PC; and a display device obtained by using this optical device.

In order to achieve the above-described object according to the present invention, there is provided an optical device comprising: a first polarizer which has an absorption axis in a thickness direction; a second polarizer which has an absorption axis in a thickness direction; and a functional layer which is disposed between the first polarizer and the second polarizer and is capable of switching between a state in which an in-plane retardation is 0 and a state in which the in-plane retardation is greater than 0.

In the optical device according to the present invention, it is preferable that the functional layer switches between a state in which the in-plane retardation is 0 and a state in which the in-plane retardation is $\lambda/2$.

Further, it is preferable that the optical device further comprises a moving unit, the functional layer includes a first phase difference plate and a second phase difference plate which each include a patterned optically-anisotropic layer having a constant phase difference and divided into a plurality of belt-like regions in the same plane, and are disposed such that longitudinal directions of the belt-like regions match each other, directions of slow axes in one belt-like region match each other and directions of slow axes of belt-like regions adjacent to each other are different from each other in each of the patterned optically-anisotropic layer of the first phase difference plate and the patterned optically-anisotropic layer of the second phase difference plate, and the moving unit moves the first phase difference plate and the second phase difference plate relative to each other in arrangement directions of the belt-like regions.

Further, it is preferable that the optical device further comprises a moving unit, the functional layer includes a first phase difference plate and a second phase difference plate which each include a patterned optically-anisotropic layer having a constant phase difference and divided into a plurality of lattice-like rectangular regions in the same plane, and are disposed such that lattice-like division directions match each other, directions of slow axes in one rectangular region match each other and directions of slow axes of the rectangular regions adjacent to each other in the lattice-like division directions are different from each other in each of the patterned optically-anisotropic layer of the first phase difference plate and the patterned optically-anisotropic layer of the second phase difference plate, and the moving unit moves the first phase difference plate and the second phase difference plate relative to each other in one direction of the lattice-like division directions.

Further, it is preferable that in each of the patterned optically-anisotropic layer of the first phase difference plate and the patterned optically-anisotropic layer of the second phase difference plate, the slow axes of the rectangular regions adjacent to each other in the lattice-like division directions are orthogonal to each other.

Further, it is preferable that in each of the patterned optically-anisotropic layer of the first phase difference plate and the patterned optically-anisotropic layer of the second phase difference plate, the slow axes of the belt-like regions adjacent to each other are orthogonal to each other.

Further, it is preferable that the first phase difference plate and the second phase difference plate are $\lambda/4$ plates.

Further, it is preferable that the patterned optically-anisotropic layer of the first phase difference plate and the patterned optically-anisotropic layer of the second phase difference plate contain a rod-like liquid crystal compound or a discotic liquid crystal compound.

Further, it is preferable that the patterned optically-anisotropic layer of the first phase difference plate and the patterned optically-anisotropic layer of the second phase difference plate have an inverse wavelength dispersion property.

Further, it is preferable that the first polarizer and the second polarizer have a structure in which a birefringent material is aligned in the thickness direction.

Further, it is preferable that the birefringent material is a dichroic coloring agent.

According to the present invention, there is provided a display device comprising: a display element; and the optical device according to the present invention.

According to the optical device and the display device of the present invention, it is possible to switch between image display at a typical wide viewing angle and image display at a narrow viewing angle obtained by limiting the viewing angle with a simple operation without performing detachment and attachment of a member by being mounted on a tablet PC or a notebook PC with a simple configuration.

DESCRIPTION OF THE PREFERRED EMBODIMENTS

Hereinafter, an optical device and a display device according to the embodiment of the present invention will be described in detail based on preferred examples illustrated in the accompanying drawings.

Further, the numerical ranges shown using "to" in the present specification indicate ranges including the numerical values described before and after "to" as the lower limits and the upper limits.

In the present specification, the concept of "the same" includes a typically acceptable error range in the technical field. Further, in the present specification, the concept of "all", "any", or "the entire surface" includes a typically acceptable error range in the technical field, for example, a case of 99% or greater, 95% or greater, or 90% or greater in addition to a case of 100%.

In the present specification, Re (λ) represents an in-plane retardation at a wavelength λ. The wavelength λ is set to 550 nm unless otherwise specified.

In the present specification, Re (λ) represents a value measured at the wavelength λ using AxoScan OPMF-1 (manufactured by OPTO SCIENCE, INC.). A slow axis direction (°) is calculated by inputting an average refractive index ((Nx+Ny+Nz)/3) and a film thickness (d (μm)) in AxoScan based on "Re (λ)=R0 (λ)".

In addition, R0 (λ) represents a numerical value calculated by AxoScan and indicates Re (λ).

Figure 1:
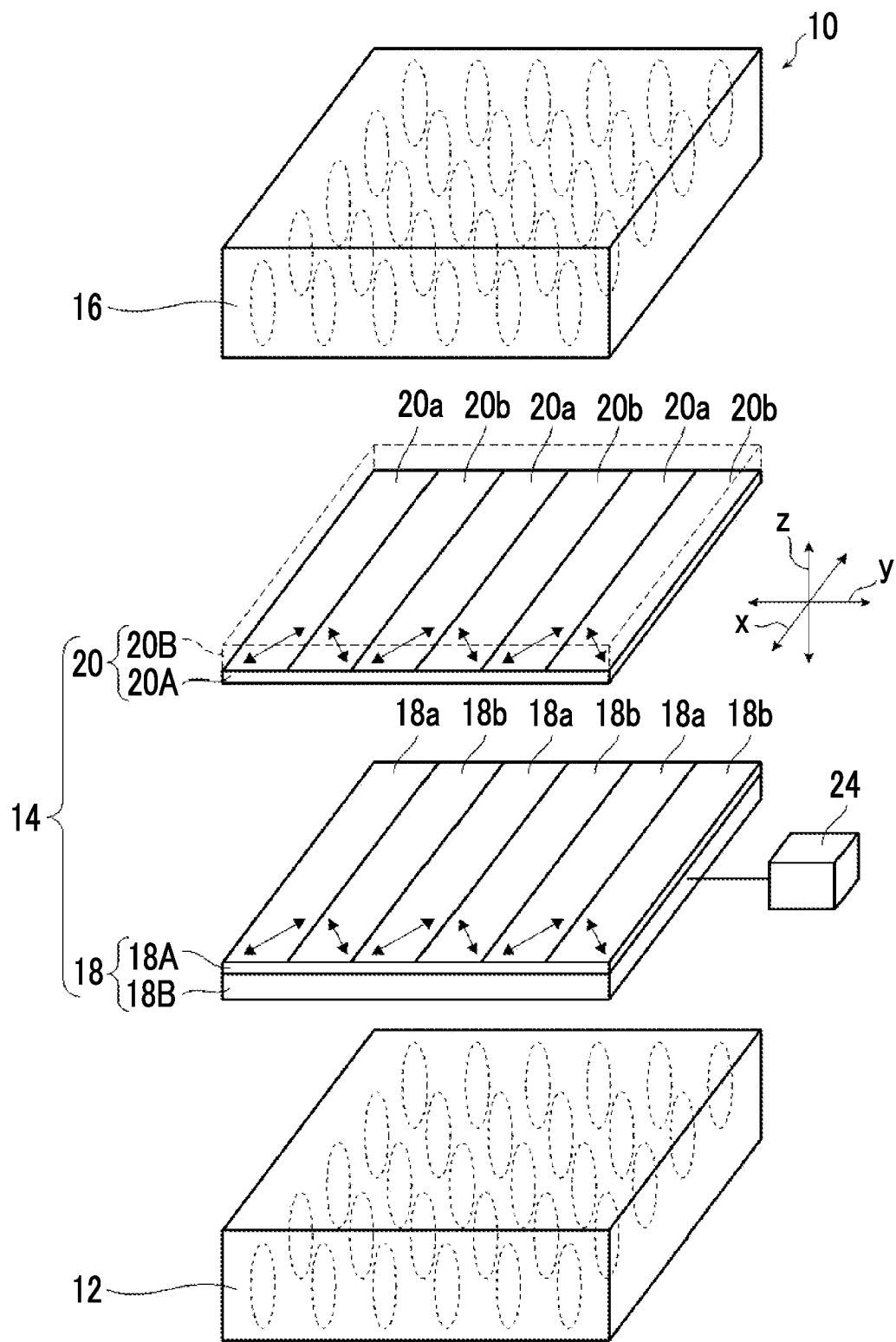
FIG. 1 is a view illustrating a configuration of an optical device according to an embodiment.

As illustrated in FIG. 1, an optical device 10 includes a first polarizer 12, a functional layer 14, and a second polarizer 16. In the optical device 10 illustrated in the example of the figure, the functional layer 14 is formed of a first phase difference plate 18 and a second phase difference plate 20. Further, the optical device 10 is provided with a moving unit 24 for moving the first phase difference plate 18.

In the optical device 10, the first phase difference plate 18 is formed of a patterned optically-anisotropic layer 18A and a support 18B and the second phase difference plate 20 is formed of a patterned optically-anisotropic layer 20A and a support 20B. In FIG. 1, the support 20B of the second phase difference plate 20 is indicated by a broken line in order to clearly show the configuration of the second phase difference plate 20.

In FIG. 1, the arrows of the patterned optically-anisotropic layer 18A and the patterned optically-anisotropic layer 20A indicate the directions of slow axes of the patterned optically-anisotropic layer 18A and the patterned optically-anisotropic layer 20A. In the present invention, the direction of a slow axis of the optically-anisotropic layer indicates the direction of a slow axis (in-plane slow axis) of the optically-anisotropic layer in the plane direction, which is a direction of a slow axis in an x-y direction described below.

Figure 2:
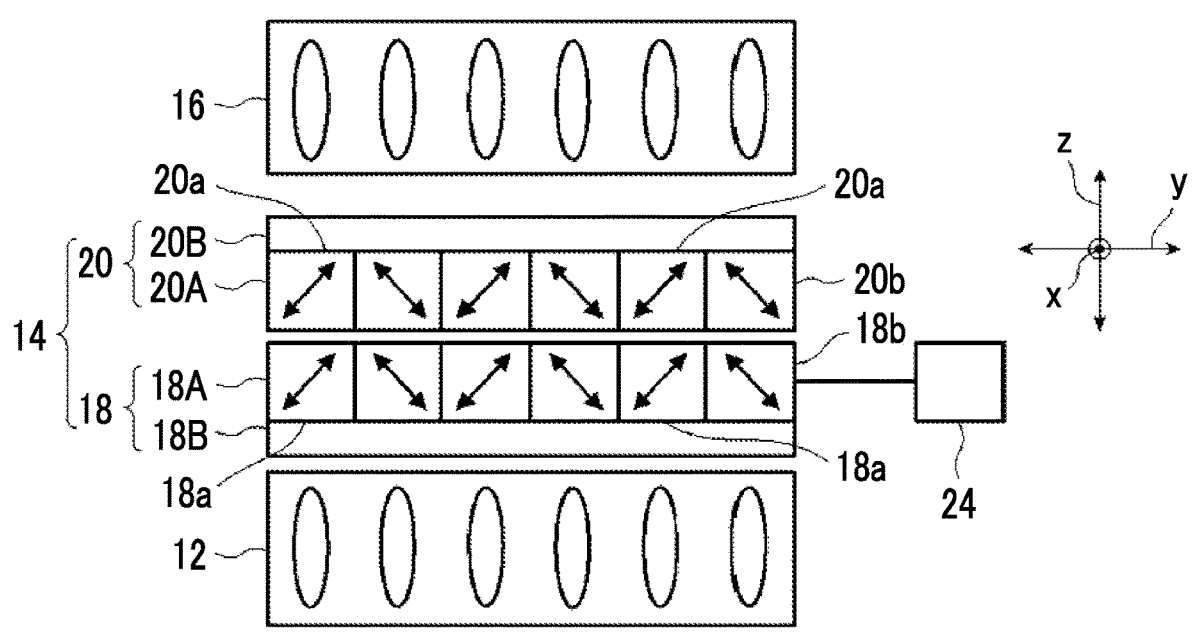
FIG. 2 is a view illustrating directions of absorption axes and directions of slow axes of the optical device according to the embodiment.
Figure 5:
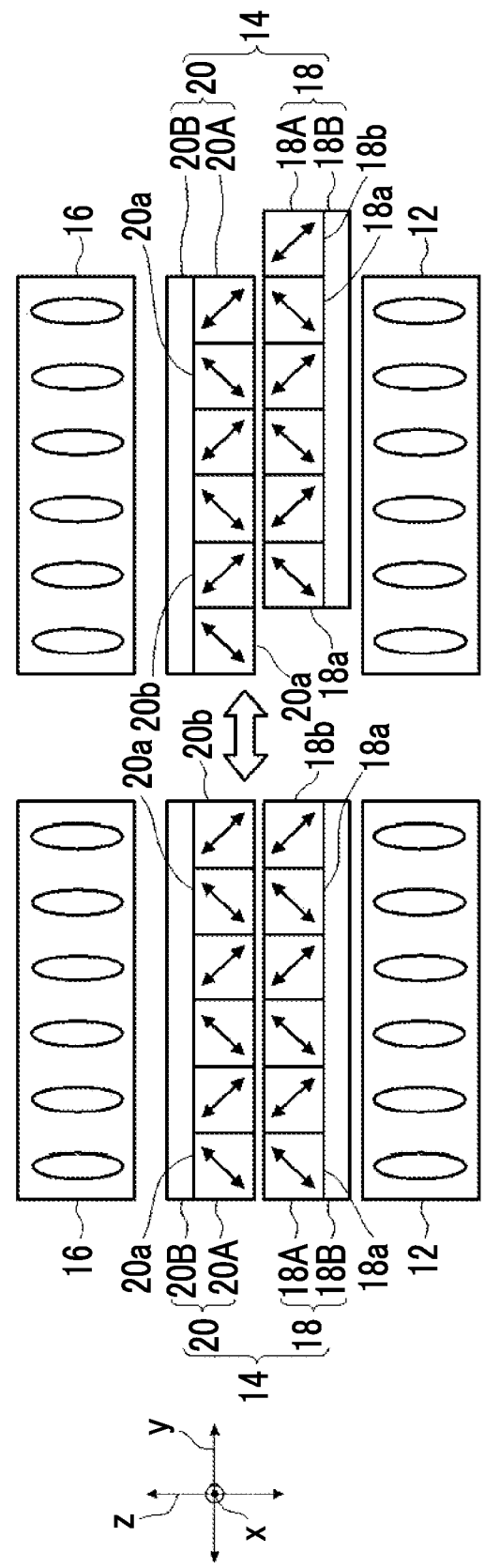
FIG. 5 is a view describing the action of the optical device according to the embodiment.

The optical device 10 having such a configuration has a configuration in which the first polarizer 12, the second phase difference plate 20, and the second polarizer 16 are laminated in this order by facing the main surfaces (maximum surfaces) thereof. Therefore, the optical device 10 has a configuration as conceptually illustrated in FIG. 2 at the time of being seen in an x direction. In FIG. 2, the arrows of the patterned optically-anisotropic layer 18A and the patterned optically-anisotropic layer 20A indicate the directions (the directions of the slow axes in the x-y direction described below) of (in-plane) slow axes of the patterned optically-anisotropic layer 18A and the patterned optically-anisotropic layer 20A similar to FIG. 1. In terms of this point, the same applies to FIG. 5 shown below.

Further, in the example illustrated in the figure, the first polarizer 12, the first phase difference plate 18, the second phase difference plate 20, and the second polarizer 16 are spaced from one another. However, in a case where the first phase difference plate 18 can be moved by the moving unit 24 described below, at least one of the first polarizer 12, the first phase difference plate 18, the second phase difference plate 20, or the second polarizer 16 may be brought into contact with a member adjacent thereto. Further, the first polarizer 12 and the first phase difference plate 18 may be adhered to each other using an adhesive layer or the like.

Both of the first polarizer 12 and the second polarizer 16 (hereinafter, also referred to as a "polarizing film") are polarizers having absorption axes in the thickness direction.

In the present invention, the expression "the first polarizer 12 and the second polarizer 16 have absorption axes in the thickness direction" indicates that the angles of the absorption axes of the first polarizer 12 and the second polarizer 16 with respect to the film surfaces (main surfaces) of the first polarizer 12 and the second polarizer 16 are in a range of 80° to 90°. In the first polarizer 12 and the second polarizer 16, the angles of the absorption axes are preferably in a range of 85° to 90° and most preferably perpendicular (90°) to the film surfaces thereof.

The first polarizer 12 and the second polarizer 16 having absorption axes in the thickness direction can be confirmed according to the following method. In other words, a transmittance T of each of the first polarizer 12 and the second polarizer 16 is measured while changing a polar angle θ by 10° in the range of −50° to 50° using AxoScan OPMF-1 (manufactured by OPTO SCIENCE, INC.). In this measurement, in a case where the polar angle where the transmittance is maximized is set as θ0°, "90°—θ0°" becomes the "angle of the absorption axis". Therefore, it is possible to confirm that the first polarizer 12 and the second polarizer 16 have absorption axes in the thickness direction.

Further, the polar angle θ is an angle of the first polarizer 12 or the second polarizer 16 with respect to the vertical line of the film surface.

The first polarizer 12 and the second polarizer 16 have absorption axes in the thickness direction. Further, "having an absorption axis" indicates having a transmission axis in an orthogonal direction.

As illustrated in FIG. 1, the thickness direction is set as a z direction, the longitudinal direction of the belt-like regions described below which is orthogonal to the z direction is set as an x direction, and the arrangement direction of the belt-like regions described below which is orthogonal to the z direction and the x direction is set as a y direction.

Figure 3:
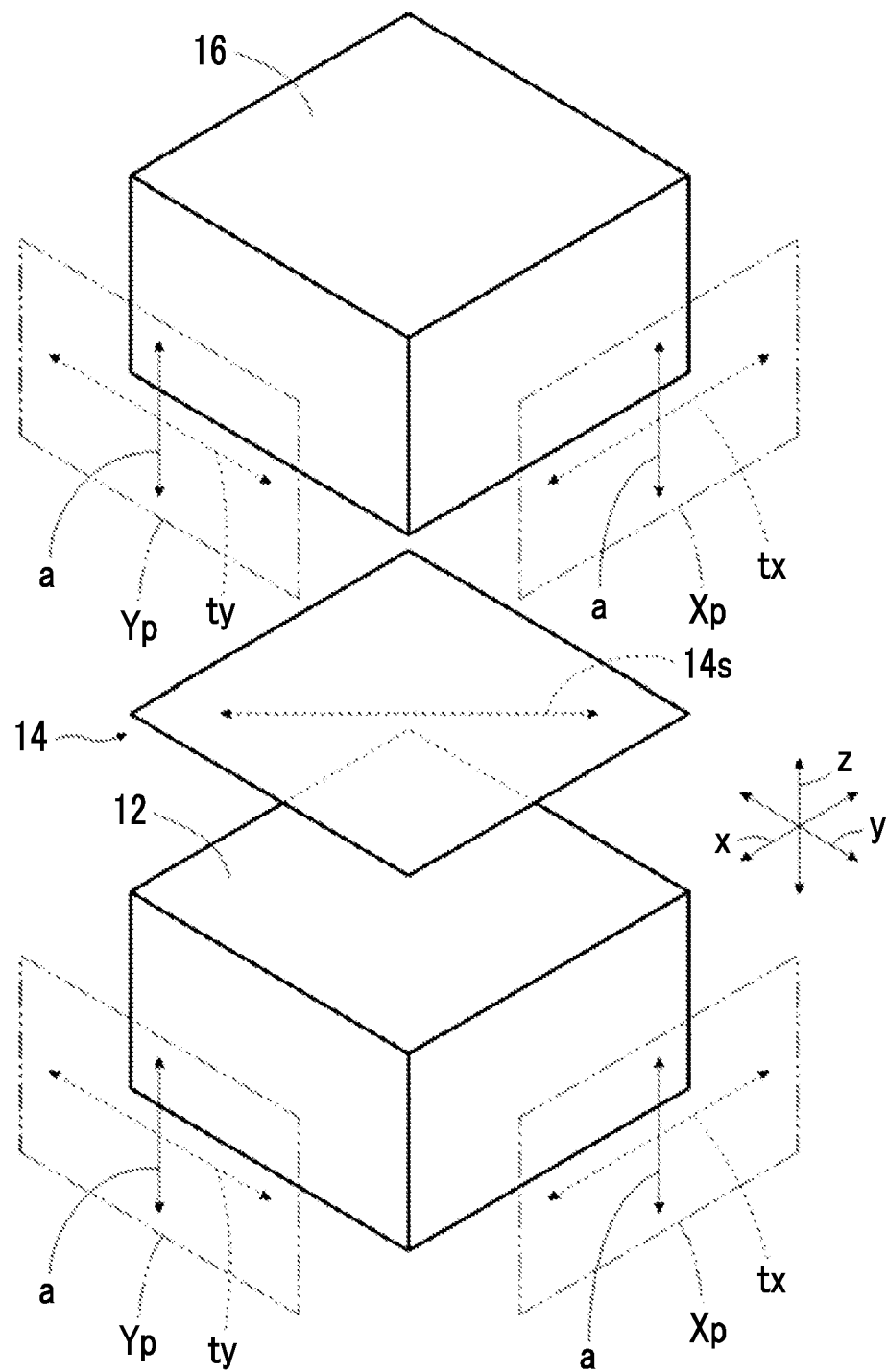
FIG. 3 is a view illustrating directions of absorption axes and directions of transmission axes of the optical device according to the embodiment.

As conceptually illustrated in FIG. 3, in such an x-y-z direction, the first polarizer 12 and the second polarizer 16 are each in a state of a polarizing plate Yp (two-dot chain line) which has an absorption axis a (an arrow indicated by the solid line) in the z direction, has a transmission axis ty (an arrow indicated by the broken line) in the y direction, and is in parallel with the z direction and the y direction, at the time of being observed in the x direction (obliquely in the x direction). Further, the first polarizer 12 and the second polarizer 16 are each in a state of a polarizing plate Xp which has an absorption axis a in the z direction, has a transmission axis tx in the x direction, and is in parallel with the z direction and the x direction, at the time of being observed in they direction (obliquely in the y direction).

This point will be described below in detail.

Hereinafter, the first polarizer 12 and the second polarizer 16 will be described in detail.

Further, since the first polarizer 12 and the second polarizer 16 basically have the same configuration except that these are positioned at different positions, the description will be made using the first polarizer 12 as a representative example in a case where these are not required to be distinguished from each other.

The configuration of the first polarizer 12 is not particularly limited as long as the first polarizer 12 has an absorption axis in the thickness direction. Among examples of the polarizer, the first polarizer 12 which contains a birefringent material (a material having birefringence (anisotropic absorptive material)) and in which the birefringent material is aligned in a predetermined direction is preferable. More specifically, for example, in a case where a dichroic coloring agent described below is used as the birefringent material, the long axis of the dichroic coloring agent is disposed to be in parallel with the thickness direction of the first polarizer 12.

The birefringent material is not particularly limited and can be appropriately selected according to the purpose thereof. Examples thereof include inorganic particles, dichroic coloring agents, anisotropic metal nanoparticles, carbon nanotubes, and metal complexes. Among these, dichroic coloring agents, anisotropic metal nanoparticles, and carbon nanotubes are particularly preferable.

—Dichroic Coloring Agent—

Examples of the dichroic coloring agent include an azo-based coloring agent and an anthraquinone-based coloring agent. These may be used alone or in combination of two or more kinds thereof.

In the present invention, the dichroic coloring agent is defined as a compound having a function of absorbing light. The maximum absorption and the absorption band of the dichroic coloring agent are not limited, but a dichroic coloring agent having a maximum absorption in a yellow region (Y), a magenta region (M), or a cyan region (C) is preferable. Further, two or more kinds of dichroic coloring agents may be used. Further, it is preferable that a mixture of dichroic coloring agents respectively having a maximum absorption in Y, M, and C is used and more preferable that dichroic coloring agents are mixed such that absorption can be made in the entire visible range (400 to 750 nm) and used. Here, the yellow region is in a range of 420 to 490 nm, the magenta region is in a range of 495 to 570 nm, and the cyan region is in a range of 620 to 750 nm.

Here, a chromophore used for the dichroic coloring agent will be described. The chromophore of the dichroic coloring agent is not particularly limited and can be appropriately selected according to the purpose thereof. Examples thereof include an azo coloring agent, an anthraquinone coloring agent, a perylene coloring agent, a merocyanine coloring agent, an azomethine coloring agent, a phthaloperylene coloring agent, an indigo coloring agent, an azulene coloring agent, a dioxazine coloring agent, a polythiophene coloring agent, and a phenoxazine coloring agent. Among these, an azo coloring agent, an anthraquinone coloring agent, or a phenoxazine coloring agent is preferable, and an anthraquinone coloring agent or a phenoxazone coloring agent (phenoxazine-3-one) is more preferable.

Further, specific examples of the coloring agent include the coloring agents described in paragraphs 0022 to 0075 of JP2008-275976A, and the contents of which are incorporated herein by reference.

—Anisotropic Metal Nanoparticles—

Anisotropic metal nanoparticles are nano-sized rod-like metal fine particles having a diameter of several nanometers to 100 nm. The rod-like metal fine particles indicate particles having an aspect ratio (length of long axis/length of short axis) of 1.5 or greater.

Such anisotropic metal nanoparticles exhibit surface plasmon resonance and exhibit absorption in the ultraviolet to infrared region. For example, since the anisotropic metal nanoparticles having a short axis length of 1 to 50 nm, a long axis length of 10 to 1000 nm, and an aspect ratio of 1.5 or greater are capable of changing the absorption position in the short axis direction and the long axis direction, a polarizing film obtained by aligning such anisotropic metal nanoparticles in an oblique direction with respect to the horizontal plane of the film becomes an anisotropic absorbing film.

—Carbon Nanotubes—

A carbon nanotube is elongated tubular carbon having a fiber diameter of 1 to 1000 nm, a length of 0.1 to 1000 μm, and an aspect ratio of 100 to 10000. Examples of a known method of preparing carbon nanotubes include an arc discharge method, a laser evaporation method, a thermal chemical vapor deposition (CVD) method, and a plasma CVD method. Carbon nanotubes obtained using an arc discharge method and a laser evaporation method are divided into single wall nanotubes (SWNT) with only one graphene sheet and multi wall nanotubes (MWNT) with a plurality of graphene sheets.

Further, in a case where a thermal CVD method and a plasma CVD method are used, MWNT can be mainly prepared. SWNT has a structure in which one graphene sheet formed by connecting carbon atoms using a strongest bond referred to as an $SP^2$ bond in a hexagonal shape is wound into a tubular shape.

The content of the birefringent material in the first polarizer 12 is preferably in a range of 0.1% to 90.0% by mass and more preferably in a range of 1.0% to 30.0% by mass with respect to the total mass of the first polarizer 12. In a case where the content of the birefringent material is 0.1% by mass or greater, the polarizability can be sufficiently obtained. Meanwhile, in a case where the content thereof is 90% by mass or less, the polarizer can be formed without any trouble and the transmittance of the polarizer can be maintained.

The first polarizer 12 contains other components such as a dispersant, a solvent, and a binder resin in addition to the birefringent material depending on the method of forming the polarizer (alignment method).

<<Method of Producing First Polarizer 12 (Second Polarizer 16)>>

A method of producing the first polarizer 12 is not particularly limited as long as the absorption axis can be aligned in the substantially vertical direction with respect to the surface of the base material (the surface of the polarizer) and can be appropriately selected according to the purpose thereof. Examples thereof include a metal nanorod deposition method in a liquid crystal alignment field (1); a guest-host liquid crystal method (2); and an anodized alumina method (3). Among these, a guest-host liquid crystal method is particularly preferable.

Examples of the method include the methods described in paragraphs 0087 to 0108 of JP2008-275976A, and the contents of which are incorporated herein by reference.

The thickness of the first polarizer 12 is not particularly limited and can be appropriately selected according to the purpose thereof. Further, the thickness thereof is preferably in a range of 0.1 to 10 μm and more preferably in a range of 0.3 to 3 μm.

In the optical device 10, the functional layer 14 is disposed between the first polarizer 12 and the second polarizer 16.

The functional layer 14 switches between the state in which the in-plane retardation is 0 (zero) and the state in which the in-plane retardation is greater than 0. In the example illustrated in the figure, the functional layer 14 includes the first phase difference plate 18 and the second phase difference plate 20. Both of the first phase difference plate 18 and the second phase difference plate 20 are λ/4 plates, and the functional layer 14 switches between the state in which the in-plane retardation is 0 and the state in which the in-plane retardation is λ/2. Here, the in-plane retardation being 0 (zero) includes a case where the in-plane retardation is approximately 0. Further, "approximately 0" indicates a range of 0 to 3 nm.

Further, since the first phase difference plate 18 and the second phase difference plate 20 basically have the same configuration, the description will be made using the first phase difference plate 18 as a representative example in a case where the first phase difference plate 18 and the second phase difference plate 20 are not required to be distinguished from each other.

The first phase difference plate 18 (second phase difference plate 20) includes the patterned optically-anisotropic layer 18A (20A) and the support 18B (20B).

As illustrated in FIG. 2, in the patterned optically-anisotropic layer 18A of the first phase difference plate 18, the slow axis is divided into a plurality of belt-like regions in the same plane. The belt-like regions are arranged in the y direction, and the longitudinal direction is in the x direction.

In the example illustrated in the figure, the patterned optically-anisotropic layer 18A (20A) has three first belt-like regions 18a (20a) and three second belt-like regions 18b (20b) which are alternately formed linear regions having the same width and has a total of six first belt-like regions 18a (20a) and second belt-like regions 18b (20b).

As described above, the first phase difference plate 18 is a λ/4 plate, the phase difference of the first belt-like region 18a and the second belt-like region 18b of the patterned optically-anisotropic layer 18A is constant, and the directions of the slow axes of the first belt-like region 18a are orthogonal to the directions of the slow axes of the second belt-like region 18b. In other words, the patterned optically-anisotropic layer 18A of the first phase difference plate 18 has patterned optical anisotropy in which two kinds of belt-like regions are alternately arranged such that the directions of the slow axes are orthogonal to each other.

In FIG. 1, the arrow in each belt-like region indicates the direction of the (in-plane) slow axis as described above.

In the first phase difference plate 18, each first belt-like region 18a has a slow axis inclined by 45° with respect to the arrangement direction of belt-like regions, that is, the y direction. A second belt-like region 18b has a slow axis inclined by 135° with respect to the y direction. Accordingly, the slow axis of the first belt-like region 18a and the slow axis of the second belt-like region 18b are orthogonal to each other.

FIG. 1 illustrates the configuration in which the direction of the slow axis of the first belt-like region 18a and the direction of the slow axis of the second belt-like region 18b are orthogonal to each other, but the present invention is not limited thereto as long as the directions are different from each other. The angle between the slow axis of the first belt-like region 18a and the slow axis of the second belt-like region 18b is preferably in a range of 70° to 110°, more preferably in a range of 80° to 100°, and most preferably 90°.

The in-plane retardation Re (550) of the first belt-like region 18a and the second belt-like region 18b at a wavelength of 550 nm is not particularly limited, but is preferably in a range of 110 to 160 nm, more preferably in a range of 120 to 150 nm, and still more preferably in a range of 125 to 140 nm. Further, as in the example illustrated in the figure, it is preferable that the entire first phase difference plate 18 shows the range of the above-described in-plane retardation in a case where the first phase difference plate 18 has a layer (in the example illustrated in the figure, the support 18B) other than the patterned optically-anisotropic layer 18A.

In a case where the first phase difference plate 18 includes the support 18B, it is preferable that the total value of Rth (the retardation in the thickness direction) of the support 18B and Rth of the patterned optically-anisotropic layer 18A satisfies a relationship of |Rth|≤20 nm.

As described above, the patterned optically-anisotropic layer 20A of the second phase difference plate 20 is a linear region with the same width and has a total of six alternating first belt-like regions 24a and second belt-like regions 24b where the directions of the slow axes are orthogonal to each other.

As illustrated in FIG. 1, the first phase difference plate 18 and the second phase difference plate 20 are disposed such that the longitudinal direction of the first belt-like region 18a and the second belt-like region 18b of the first phase difference plate 18 and the longitudinal direction of the first belt-like region 24a and the second belt-like region 24b of the second phase difference plate 20 match each other.

As described above, both of the first phase difference plate 18 and the second phase difference plate 20 are λ/4 plates. Further, the first belt-like region 18a of the first phase difference plate 18 and the first belt-like region 20a of the second phase difference plate 20 each have a slow axis inclined by 45° with respect to the y direction. Further, the second belt-like region 18b of the first phase difference plate 18 and the second belt-like region 20b of the second phase difference plate 20 each have a slow axis inclined by 135° (−45°) with respect to the y direction.

Accordingly, in the state in which the first belt-like region 18a of the first phase difference plate 18 and the second belt-like region 20b of the second phase difference plate 20 match each other in the y direction and the second belt-like region 18b of the first phase difference plate 18 and the first belt-like region 20a of the second phase difference plate 20 match each other in the y direction, the first phase difference plate 18 and the second phase difference plate 20 enter a state of two sheets of λ/4 plates in which the directions of the slow axes are orthogonal to each other are stacked, and the functional layer 14 formed of the first phase difference plate 18 and the second phase difference plate 20 has a total in-plane retardation of 0.

In a case where the first phase difference plate 18 is moved by the amount of the width of a belt-like region in the y direction from this state, in other words, the arrangement direction of the belt-like regions, the first belt-like region 18a of the first phase difference plate 18 and the first belt-like region 20a of the second phase difference plate 20 match each other in the y direction, and the second belt-like region 18b of the first phase difference plate 18 and the second belt-like region 20b of the second phase difference plate 20 match each other in the y direction. In this state, the first phase difference plate 18 and the second phase difference plate 20 enter a state of two sheets of λ/4 plates in which the directions of the slow axes match each other are stacked, and the functional layer 14 formed of the first phase difference plate 18 and the second phase difference plate 20 has a total in-plane retardation of λ/2. In this manner, the functional layer 14 enters the same state as the λ/2 plate having a slow axis 14s at an angle of 45° with respect to the x direction and the y direction.

According to the present invention, typical image display at a wide viewing angle and image display at a narrow viewing angle obtained by limiting the viewing angle are performed by employing the above-described configuration using a known display such as a liquid crystal display or an organic electroluminescent display. This point will be described below in detail.

Further, the width of the belt-like region in the first phase difference plate 18 (the second phase difference plate 20) is preferably in a range of 1 mm to 500 mm and more preferably in a range of 10 mm to 100 mm.

By setting the width of the belt-like region to 500 mm or less, the screen becomes difficult to be suitably visually recognized at the time of viewing the screen in an oblique direction. Further, by setting the width of the belt-like region to 1 mm or greater, occurrence of moire can be suppressed, and the first phase difference plate 18 is also easily moved by the moving unit 24 described below.

As described above, the first phase difference plate 18 (the second phase difference plate 20) is a λ/4 plate. A λ/4 plate is a plate having a function of converting linearly polarized light with a specific wavelength into circularly polarized light (alternatively, circularly polarized light into linearly polarized light). More specifically, a λ/4 plate is a plate in which the in-plane retardation value at a predetermined wavelength of λ nm is Re (λ)=λ/4 (alternatively, odd number times). This formula may be achieved at any wavelength (for example, 550 nm) in the visible light range. In a case where the first phase difference plate 18 is a λ/4 plate, this indicates that all combinations of the support 18B and each belt-like region of the patterned optically-anisotropic layer 18A of the first phase difference plate 18 are λ/4 plates.

Further, it is preferable that the patterned optically-anisotropic layer 18A of the first phase difference plate 18 (the patterned optically-anisotropic layer 20A of the second phase difference plate 20) has an inverse wavelength dispersion property.

It is preferable that the patterned optically-anisotropic layer 18A contains a liquid crystal compound.

As a method of forming a patterned optically-anisotropic layer 18A that contains a liquid crystal compound, a method of immobilizing a liquid crystal compound in an alignment state is exemplified. At this time, as a method of immobilizing a liquid crystal compound, a method of polymerizing and immobilizing a liquid crystal compound using a liquid crystal compound having an unsaturated double bond (polymerizable group) as the above-described liquid crystal compound is suitably exemplified. For example, a method of coating a transparent support with a composition for forming a patterned optically-anisotropic layer that contains a liquid crystal compound having an unsaturated double bond (polymerizable group) directly or via an alignment film, curing (polymerizing) the composition by irradiation of ionizing radiation, and immobilizing the liquid crystal compound is exemplified. In addition, the patterned optically-anisotropic layer may have a single layer structure or a laminated structure.

The type of the unsaturated double bond contained in the liquid crystal compound is not particularly limited, but a functional group which is capable of an addition polymerization reaction is preferable, and a polymerizable ethylenically unsaturated group or a cyclic polymerizable group is preferable. More specifically, preferred examples thereof include a (meth)acryloyl group, a vinyl group, a styryl group, and an allyl group. Among these, a (meth)acryloyl group is more preferable.

A liquid crystal compound can be typically classified into a rod-like compound and a disk-like compound based on the shape thereof. Further, the rod-like liquid crystal compound and the disk-like liquid crystal compound each have a low molecular type and a polymer type. A polymer usually indicates that the degree of polymerization is 100 or greater (Polymer Physics and Phase Transition Dynamics, written by Masao Doi, p. 2, published by Iwanami shoten, 1992). In the present invention, any liquid crystal compound can be used, and it is preferable to use a rod-like liquid crystal compound or a discotic liquid crystal compound (disk-like liquid crystal compound). Two or more kinds of rod-like liquid crystal compounds, two or more kinds of disk-like liquid crystal compounds, or a mixture of a rod-like liquid crystal compound and a disk-like liquid crystal compound may be used. It is more preferable that the patterned optically-anisotropic layer is formed using a rod-like liquid crystal compound or a disk-like liquid crystal compound that contains a polymerizable group in order to immobilize the above-described liquid crystal compound and still more preferable that the liquid crystal compound contains two or more polymerizable groups in one molecule. In a case where the liquid crystal compound is a mixture of two more kinds thereof, it is preferable that at least one kind of liquid crystal compound contains two or more polymerizable groups in one molecule.

As the rod-like liquid crystal compound, for example, the compounds described in claim 1 of JP1999-513019A (JP-H11-513019A) and paragraphs <0026> to <0098> of JP2005-289980A can be preferably used. As the discotic liquid crystal compound, for example, the compounds described in paragraphs <0020> to <0067> of JP2007-108732A and paragraphs <0013> to <0108> of JP2010-244038A can be preferably used, but the present invention is not limited thereto.

The alignment state of the liquid crystal compound is controlled in order to set the in-plane retardation in the patterned optically-anisotropic layer to be in the above-described range. At this time, in a case where a rod-like liquid crystal compound is used, it is preferable that the rod-like liquid crystal compound is immobilized in a state of being horizontally aligned. Further, in a case where a discotic liquid crystal compound is used, it is preferable that the discotic liquid crystal compound is immobilized in a state of being vertically aligned. In the present invention, the "rod-like liquid crystal compound is horizontally aligned" means that the director of the rod-like liquid crystal compound is parallel with the layer surface, and the "discotic liquid crystal compound is vertically aligned" means that the direction of the normal line of the disc plane of the discotic liquid crystal compound is parallel to the film surface of the patterned optically-anisotropic layer. The exact horizontal alignment or exact vertical alignment is not required and the error range is ±20° from each of the exact angles. The error range is preferably within ±5°, more preferably within ±3°, still more preferably ±2°, and most preferably ±1°.

Further, in order to make the liquid crystal compound enter the horizontal alignment state or vertical alignment state, an additive (alignment control agent) that promotes horizontal alignment or vertical alignment may be used. Various known additives can be used as the additive.

Various known methods can be used as the method of forming the patterned optically-anisotropic layer. Examples of the method include methods described in paragraphs <0039> to <0041> of JP2014-089431A.

The thickness of the patterned optically-anisotropic layer is not particularly limited, but is preferably in a range of 0.1 to 10 μm and more preferably in a range of 0.1 to 5 μm, from the viewpoint of further reducing the thickness of the optical film.

The first phase difference plate 18 may include layers other than the patterned optically-anisotropic layer.

For example, in the optical device 10 in the example illustrated in the figure, the first phase difference plate 18 (the second phase difference plate 20) includes the transparent support 18B (the support 20B). In other words, both phase difference plates may be configured to have a transparent support and a patterned optically-anisotropic layer disposed on the support. In a case where both phase difference plates comprise a support, the mechanical strength of the phase difference plates is improved.

Examples of the material for forming the support 18B include a polycarbonate-based polymer, a polyester-based polymer such as polyethylene terephthalate or polyethylene naphthalate, a (meth)acrylic polymer such as polymethyl methacrylate, a styrene-based polymer such as polystyrene or an acrylonitrile-styrene copolymer (AS resin), a polyolefin-based polymer such as polyethylene, polypropylene, or an ethylene-propylene copolymer, a vinyl chloride-based polymer, an amide-based polymer such as nylon or aromatic polyamide, a polysulfone-based polymer, a polyether sulfone-based polymer, a polyether ether ketone-based polymer, a polyphenylene sulfide-based polymer, a vinylidene chloride-based polymer, a vinyl alcohol-based polymer, a vinyl butyral-based polymer, an arylate-based polymer, a polyoxymethylene-based polymer, and an epoxy-based polymer.

As the material for forming the support 18B, a thermoplastic norbornene-based resin can be preferably used. Examples of the thermoplastic norbornene-based resin include ZEONEX and "ZEONOR" (manufactured by Zeon corporation), and ARTON (manufactured by JSR Corporation).

Further, as the material for forming the support, a cellulose-based polymer (hereinafter, also referred to as cellulose acylate) typified by triacetyl cellulose can be preferably used.

The thickness of the support 18B is not particularly limited, but is preferably in a range of 15 to 100 µm, more preferably in a range of 20 to 80 µm, and particularly preferably in a range of 40 to 60 µm from the viewpoint of reducing the thickness of the first phase difference plate 18.

Further, various additives (such as an optically-anisotropic adjusting agent, a wavelength dispersion adjusting agent, fine particles, a plasticizer, an ultraviolet absorbing agent, a deterioration inhibitor, and a release agent) can be added to the support 18B.

An alignment film may be provided between the support 18B of the first phase difference plate 18 and the patterned optically-anisotropic layer 18A (between the support 20B of the second phase difference plate 20 and the patterned optically-anisotropic layer 20A) as necessary. By providing the alignment film, the alignment direction of the liquid crystal compound in the patterned optically-anisotropic layer can be easily controlled.

The alignment film typically contains a polymer as a main component. As the material of a polymer for an alignment film, various commercially available products described in numerous documents can be used. Preferred examples of the polymer material to be used include polyvinyl alcohol, polyimide, and derivatives of there. Particularly, modified or unmodified polyvinyl alcohol is preferable. As the alignment film which can be used in the present invention, modified polyvinyl alcohol described in line 24, p. 43 to line 8, p. 49 of WO01/088574A1 and paragraphs <0071> to <0095> of JP3907735B can be referred to. Further, the alignment film is usually subjected to a known rubbing treatment. In other words, it is preferable that the alignment film is a rubbing alignment film which has been subjected to a rubbing treatment.

It is preferable that the thickness of the alignment film is small. However, from the viewpoints of imparting alignment ability for forming a patterned optically-anisotropic layer and relaxing the surface unevenness of the support to form a patterned optically-anisotropic layer having a uniform film thickness, it is preferable that the alignment film has a certain degree of thickness. Specifically, the thickness of the alignment film is preferably in a range of 0.01 to 10 µm, more preferably in a range of 0.01 to 1 µm, and still more preferably in a range of 0.01 to 0.5 µm.

Further, in the present invention, it is also preferable to use a photoalignment film. The photoalignment film is not particularly limited, and examples thereof include films described in paragraphs <0024> to <0043> of WO2005/096041A and LPP-JP265CP (trade name, manufactured by Rolic technologies Ltd.).

Hereinafter, a preferable example of the method of producing the first phase difference plate 18 (second phase difference plate 20) obtained by using a photoalignment film will be described with reference to the conceptual view of FIG. 4.

First, the surface of the support 18B is coated with a composition for forming a photoalignment film according to a known method such as spin coating and dried to form a photoisomerizable composition layer L which becomes a photoalignment film.

Next, the support 18B used to form the photoisomerizable composition layer L which becomes a photoalignment film is placed on a movable stage 30 that linearly moves in one direction.

Further, a light screen 32 is immobilized above the support 18B such that the edges of the light screen 32 and the support 18B match each other and the light screen 32 does not cover the support 18B. In this manner, during the movement of the movable stage 30 to the side of the light screen 32, the support 18B (photoisomerizable composition layer L) is hidden below the light screen 32 by the movement amount.

Further, a linearly polarizing plate 34 such as a wire grid polarizing plate is rotatably provided above the light screen 32 by setting the center thereof as a rotary axis in a state of facing the support 18B. The linearly polarizing plate 34 may rotate according to a known method of using an ultraviolet (UV)-transmitting rotary stage. In this state, the polarizing axis is in a state of being inclined by 45° with respect to the movement direction (y direction) of the movable stage 30 described below by the linearly polarizing plate 34.

Further, a light source is disposed such that the photoisomerizable composition layer L is irradiated with light that aligns the photoisomerizable composition layer L, such as UV, through the linearly polarizing plate 34.

In this state, first, the photoisomerizable composition layer L is irradiated with UV through the linearly polarizing plate 34. The photoisomerizable composition layer L is aligned by irradiation with UV according to the direction of the polarizing axis of the linearly polarizing plate 34.

Next, the linearly polarizing plate 34 is allowed to rotate at a predetermined angle, for example, 90°, and the movable stage 30 is allowed to move in the y direction indicated by the arrow, that is, toward the light screen 32 by the same amount as the width of the belt-like region. Accordingly, the photoisomerizable composition layer L is blocked from UV by the light screen 32 by the width of the belt-like region. Thereafter, the photoisomerizable composition layer L is irradiated with UV through the linearly polarizing plate 34 again, and the photoisomerizable composition layer L is aligned.

Next, similarly, the linearly polarizing plate 34 is allowed to rotate, for example, at 90°, the movable stage 30 is allowed to move in the y direction indicated by the arrow by the same distance as the width of the belt-like region, and the layer L of the composition is irradiated with UV through the linearly polarizing plate 34 again so that the photoisomerizable composition layer L is aligned.

Hereinafter, similarly, the rotation of the linearly polarizing plate 34 at a predetermined angle, the movement of the movable stage 30 in the y direction indicated by the arrow, and the irradiation with UV are repeatedly performed to form the photoalignment film on the surface of the support 18B. In other words, according to this production method, the movement direction of the movable stage 30 becomes the arrangement direction of the belt-like regions.

After the photoalignment film is formed in the above-described manner, the first phase difference plate 18 is prepared by coating the film with a liquid crystal composition which becomes the patterned optically-anisotropic layer 18A, drying the composition, and curing the composition by irradiation with ultraviolet rays.

As is well known, the alignment of the photoisomerizable composition which becomes the photoalignment film depends on the polarized light finally applied. Therefore, by forming the photoalignment film and the patterned optically-anisotropic layer 18A in the above-described manner, the patterned optically-anisotropic layer 18A having a plurality of alternating belt-like regions where the directions of the slow axes are orthogonal to each other can be formed as illustrated in FIGS. 1 and 2.

The optical device 10 includes the moving unit 24 for moving the first phase difference plate 18 in the y direction (the arrangement direction of the belt-like regions).

The moving unit 24 is used for moving the first phase difference plate 18 in the y direction by the same amount (same length) as the width of the belt-like region. By allowing the moving unit to move the first phase difference plate 18, as described above, the optical device 10 switches between the state in which the first belt-like region 18a of the first phase difference plate 18 and the second belt-like region 20b of the second phase difference plate 20 match each other in the y direction and the second belt-like region 18b of the first phase difference plate 18 and the first belt-like region 20a of the second phase difference plate 20 match each other in the y direction and the state in which the first belt-like region 18a of the first phase difference plate 18 and the first belt-like region 20a of the second phase difference plate 20 match each other in the y direction and the second belt-like region 18b of the first phase difference plate 18 and the second belt-like region 20b of the second phase difference plate 20 match each other in the y direction and switches the state in which the in-plane retardation of the functional layer 14 is 0 and the state in which the in-plane retardation is $\lambda/2$.

This point will be described below in detail.

The moving unit 24 is not particularly limited, known moving unit of various sheet-like materials, for example, a method of using an actuator or a method of using a cam or a link can be used as long as the accuracy according to the width of the belt-like region can be ensured, and the moving unit is a switching unit.

Hereinafter, the optical device 10 according to the embodiment of the present invention will be described in detail by describing the action of the optical device 10 with reference to FIGS. 3, 5, and 6. Further, FIG. 5 is the same as FIG. 2, and the arrows indicate directions of the slow axes in the plane direction of the patterned optically-anisotropic layer. In FIG. 5, the moving unit 24 is not illustrated.

The optical device according to the embodiment of the present invention is basically used by being placed on display screens of various known displays (display elements) such as a liquid crystal display, an organic electroluminescent display, and a plasma display. Further, the display device according to the embodiment of the present invention is a display device that includes such a display and the optical device according to the embodiment of the present invention.

As an example, the optical device 10 is placed on the display screen of a display such that the vertical direction, that is, the top and bottom direction of a display image of the display matches the x direction and the horizontal direction of a display image of the display matches the y direction. As described above, the x direction matches the longitudinal direction of the belt-like regions of the first phase difference plate 18 and the second phase difference plate 20 in the optical device 10 and the y direction matches the arrangement direction of the same belt-like regions.

As described above, the first polarizer 12 and the second polarizer 16 are polarizers having absorption axes in the z direction (thickness direction). Accordingly, in a case where the display image is observed, for example, at an elevation angle of 45° in the x direction, the first polarizer 12 and the second polarizer 16 are each in a state of the polarizing plate Yp (two-dot chain line) which has an absorption axis a (an arrow indicated by the solid line) in the z direction, has a transmission axis ty (an arrow indicated by the broken line) in the y direction, and is in parallel with the z direction and the y direction, as conceptually illustrated in FIG. 3.

Further, in a case where the display image is observed, for example, at an elevation angle of 45° in the y direction, the first polarizer 12 and the second polarizer 16 are each in a state of a polarizing plate Xp which has an absorption axis a in the z direction, has a transmission axis tx in the x direction, and is in parallel with the z direction and the x direction.

Figure 6:
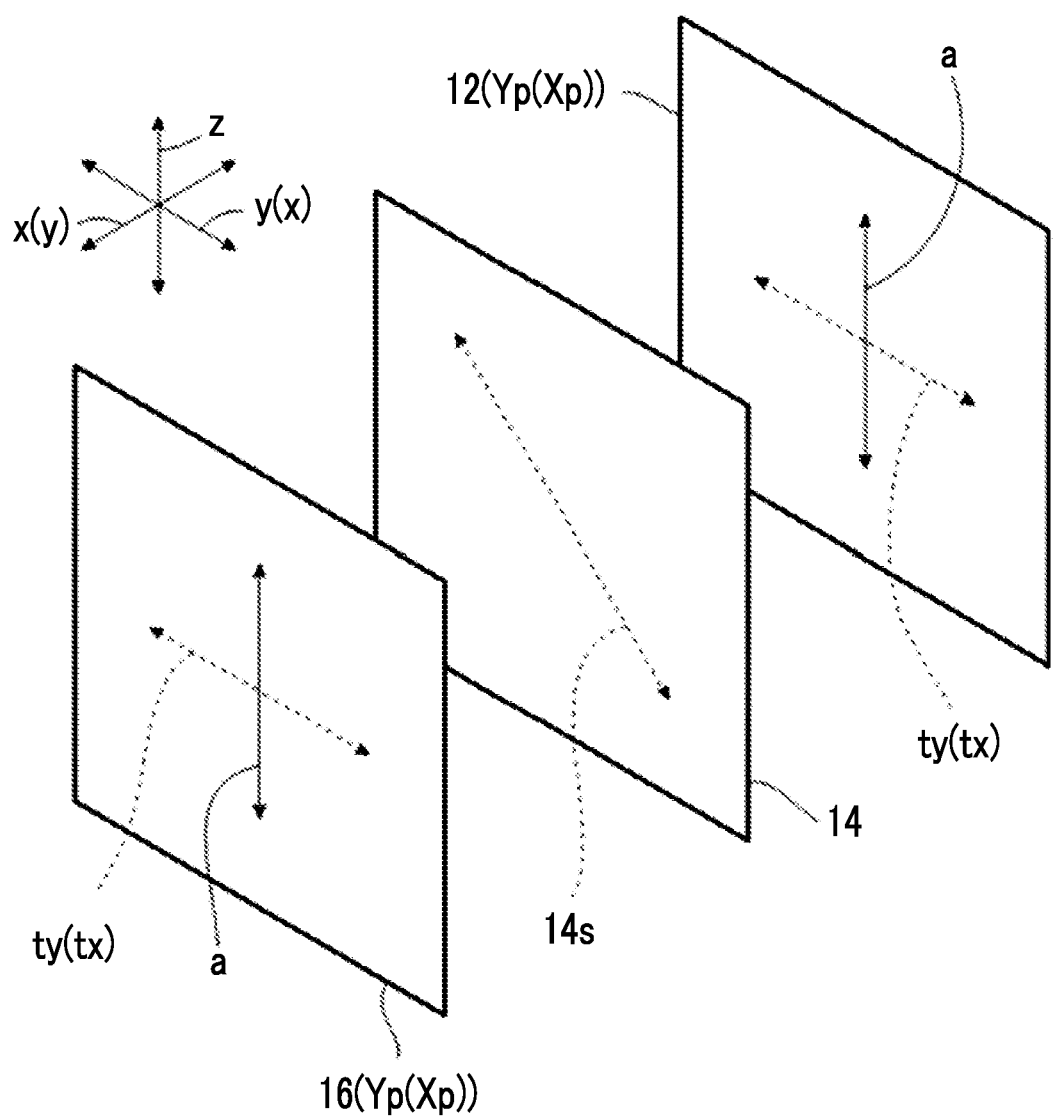
FIG. 6 is a view illustrating directions of absorption axes and directions of transmission axes of the optical device according to the embodiment.

Moreover, in a case where the display image is observed, for example, at an elevation angle of 45° in the x direction or an elevation angle of 45° in they direction, the first polarizer 12, the functional layer 14, and the second polarizer 16 are optically in a state conceptually illustrated in FIG. 6.

In a case where typical image display is performed, the optical device 10 is in a state in which the first belt-like region 18a of the first phase difference plate 18 and the second belt-like region 20b of the second phase difference plate 20 match each other in the y direction and the second belt-like region 18b of the first phase difference plate 18 and the first belt-like region 20a of the second phase difference plate 20 match each other in the y direction as illustrated on the right side of FIG. 5.

As described above, the first belt-like region 18a and the first belt-like region 20a are each a $\lambda/4$ plate having a slow axis at an angle of 45° with respect to the y direction, and the second belt-like region 18b and the second belt-like region 20b are each a $\lambda/4$ plate having a slow axis at an angle of 135° with respect to the y direction. Therefore, in this state, the functional layer 14 formed of the first phase difference plate 18 and the second phase difference plate 20 is in a state in which two sheets of $\lambda/4$ plates having slow axes orthogonal to each other are laminated and the total in-plane retardation is 0, which is in a state of not functioning.

The absorption axes a formed in the first polarizer 12 and the second polarizer 16 are in the z direction, that is, the thickness direction. Accordingly, in a case where the display is observed from the front surface, that is, in a direction (z direction) orthogonal to the display surface of the image, the absorption axis a is in the state of not functioning. In other words, the first polarizer 12 and the second polarizer 16 do not act as a polarizing plate.

Therefore, the display image can be normally observed from the front surface.

Further, in a case where the display image is observed in the x direction, the first polarizer 12 is in a state of the polarizing plate Yp which has an absorption axis a in the z direction and has the transmission axis ty in the y direction. Accordingly, in a case where the display image is observed in the x direction, light to be transmitted through the first polarizer 12 becomes linearly polarized light in the y direction due to the transmission axis ty of the polarizing plate Yp in the y direction.

The linearly polarized light in the y direction due to the first polarizer 12 is subsequently incident on the functional layer 14. Here, since the functional layer 14 is in a state of not functioning as described above, the light is transmitted through the functional layer 14.

The linearly polarized light in the y direction after being transmitted through the functional layer 14 is subsequently incident on the second polarizer 16. As described above, in a case where the display image is observed from the x direction, the second polarizer 16 is in a state of a polarizing plate Yp which has an absorption axis a in the z direction and a transmission axis ty in the y direction. Therefore, the linearly polarized light in the y direction after being incident on the second polarizer 16 is transmitted through the second polarizer 16. Consequently, the display image can be properly observed in the x direction in this state.

In addition, in a case where the display image is observed in the y direction, the first polarizer 12 is in a state of the polarizing plate Xp which has an absorption axis a in the z direction and has a transmission axis tx in the x direction. Accordingly, in a case where the display image is observed in the y direction, light to be transmitted through the first polarizer 12 becomes linearly polarized light in the x direction due to the transmission axis tx of the polarizing plate Xp in the x direction.

The linearly polarized light in the x direction due to the first polarizer 12 is subsequently incident on the functional layer 14, and the light is transmitted through the functional layer 14, similar to the case described above.

The linearly polarized light in the x direction after being transmitted through the functional layer 14 is subsequently incident on the second polarizer 16.

As described above, in a case where the display image is observed from the y direction, the second polarizer 16 is in a state of the polarizing plate Xp which has an absorption axis a in the z direction and a transmission axis tx in the x direction. Therefore, the linearly polarized light in the x direction after being incident on the second polarizer 16 is transmitted through the second polarizer 16. Consequently, the display image can be properly observed in the y direction in this state.

Therefore, the image display on the display can be observed at a typically wide viewing angle in the state illustrated on the right side of FIG. 5.

In the optical device, the moving unit 24 moves the first phase difference plate 18 in the y direction indicated by an arrow by the same amount as the width of the belt-like region in a case where the display image is displayed at a narrow viewing angle.

In this manner, the first belt-like region 18*a* of the first phase difference plate 18 and the first belt-like region 20*a* of the second phase difference plate 20 match each other in the y direction, and the second belt-like region 18*b* of the first phase difference plate 18 and the second belt-like region 20*b* of the second phase difference plate 20 match each other in the y direction.

As described above, the first belt-like region 18*a* and the first belt-like region 20*a* are each a λ/4 plate having a slow axis at an angle of 45° with respect to the y direction, and the second belt-like region 18*b* and the second belt-like region 20*b* are each a λ/4 plate having a slow axis at an angle of 135° with respect to the y direction. Therefore, in this state, the functional layer 14 formed of the first phase difference plate 18 and the second phase difference plate 20 is in a state in which two sheets of λ/4 plates having slow axes that match each other are laminated and the total in-plane retardation is λ/2. In other words, in this state, the functional layer 14 is in the same state of the λ/2 plate having a slow axis 14*s* at an angle of 45° with respect to the x direction and the y direction.

Even in this state, similar to the case described above, the display image can be properly observed in the case where the display image is observed from the front surface.

Meanwhile, in a case where the display image is observed in the x direction, the light which has been transmitted through the first polarizer 12 becomes linearly polarized light in the y direction as described above.

The linearly polarized light in the y direction due to the first polarizer 12 is subsequently incident on the functional layer 14. As described above, the functional layer 14 is in the same state as the λ/2 plate having a slow axis at an angle of 45° with respect to the y direction. Accordingly, the linearly polarized light in the y direction after being incident on the functional layer 14 is rotated by 90° in the polarization direction by the functional layer 14 and becomes linearly polarized light in the z direction.

The linearly polarized light in the z direction due to the functional layer 14 is subsequently incident on the second polarizer 16. As described above, in the case where the display image is observed in the x direction, the second polarizer 16 is in the same state as the polarizing plate Yp which has an absorption axis a in the z direction and has a transmission axis ty in the y direction. Accordingly, the linearly polarized light in the z direction due to the functional layer 14 is absorbed by the absorption axis a of the second polarizer 16 and is not provided for image display (see FIG. 6). Accordingly, in this state, the image cannot be observed in the x direction and the viewing angle in the x direction is narrowed.

In a case where the display image is observed in the y direction, the light which has been transmitted through the first polarizer 12 becomes linearly polarized light in the x direction as described above.

The linearly polarized light in the x direction due to the first polarizer 12 is subsequently incident on the functional layer 14. As described above, the functional layer 14 is in the same state as the λ/2 plate having a slow axis at an angle of 45° with respect to the x direction. Accordingly, the linearly polarized light in the x direction after being incident on the functional layer 14 is rotated by 90° in the polarization direction by the functional layer 14 and becomes linearly polarized light in the z direction.

The linearly polarized light in the z direction due to the functional layer 14 is subsequently incident on the second polarizer 16. As described above, in the case where the display image is observed in the y direction, the second polarizer 16 is in the same state as the polarizing plate Xp which has an absorption axis a in the z direction and has a transmission axis tx in the x direction. Accordingly, the linearly polarized light in the z direction due to the functional layer 14 is absorbed by the absorption axis a of the second polarizer 16 and is not provided for image display (see FIG. 6). Accordingly, in this state, the image cannot be observed in the y direction and the viewing angle in the y direction is narrowed.

Accordingly, in the state illustrated in the left side of FIG. 5, the viewing angle of the image displayed on the display becomes narrowed in both of the x direction (vertical direction) and the y direction (horizontal direction).

Further, in each of the first polarizer 12 and the second polarizer 16, since the absorption axis is in the z direction, the action as a polarizing plate is increased in both of the x direction and the y direction as the observation direction is oblique, in other words, the value of the elevation angle in the observation direction is decreased, and thus the visibility of the image is degraded.

From this state, the optical device 10 enters a state illustrated on the right side of FIG. 5 by allowing the moving unit to move the first phase difference plate 18 in the y direction indicated by an arrow by the same amount as the width of the belt-like region, and thus the display image can be observed at a typical wide viewing angle.

As described above, according to the optical device 10, it is possible to switch between image display at a typical wide viewing angle and image display at a narrow viewing angle obtained by narrowing the viewing angle vertically and horizontally, by performing a simple operation of moving a phase difference plate by a distance of approximately 10 mm.

In addition, the optical device 10 has a simple configuration in which only two sheets of phase difference plates respectively having a patterned optically-anisotropic layer are disposed between two sheets of polarizers respectively having an absorption axis in the thickness direction.

Figure 7:
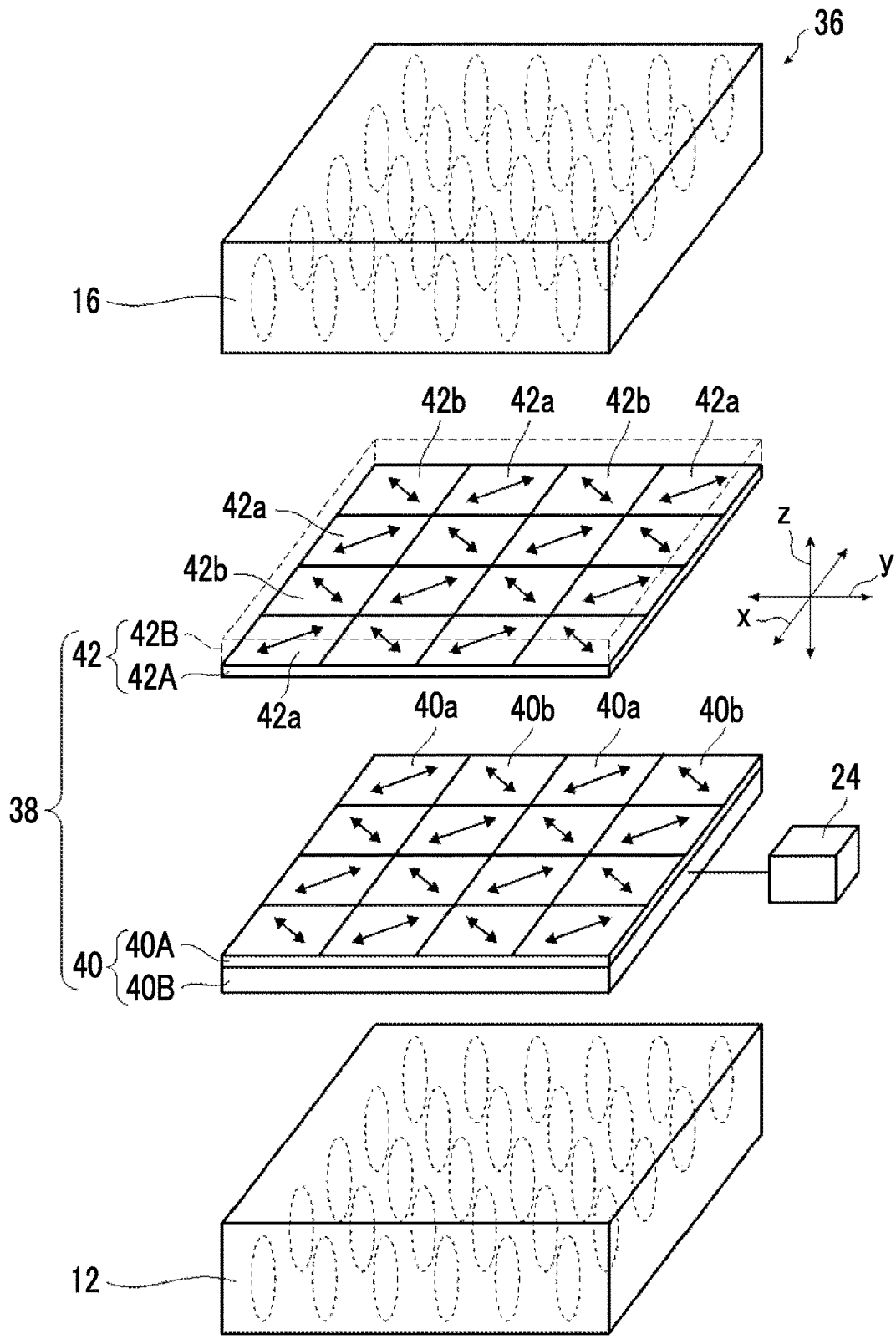
FIG. 7 is a view illustrating a configuration of an optical device according to another embodiment.

FIG. 7 conceptually illustrates another example of the optical device according to the embodiment of the present invention.

Further, since an optical device 36 illustrated in FIG. 7 has the same members as in the optical device 10 illustrated in FIG. 1 (FIGS. 1 to 6), the same members are denoted by the same reference numerals and different portions will be mainly described.

Figure 8:
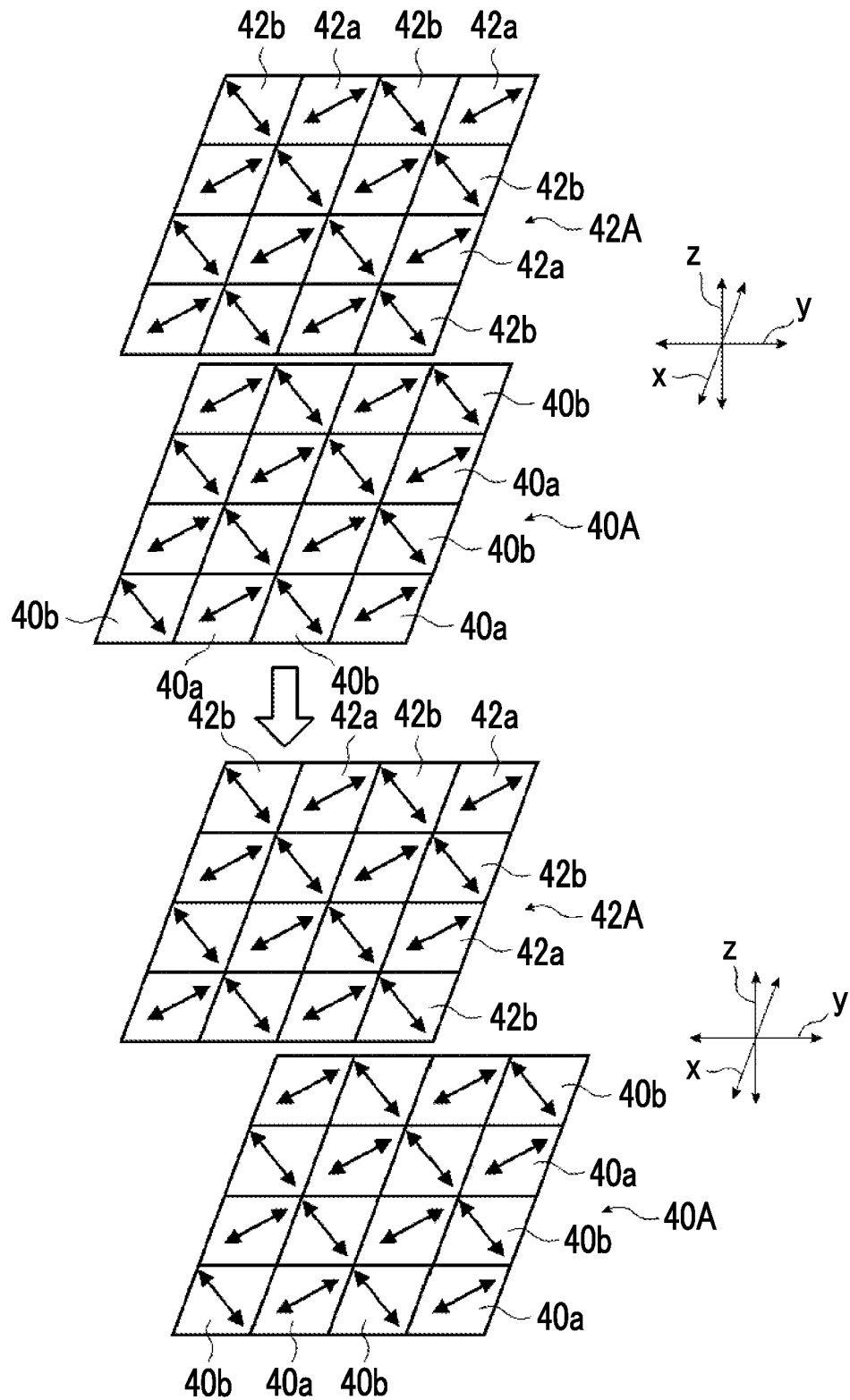
FIG. 8 is a view describing the action of the optical device according to the other embodiment.
Figure 9:
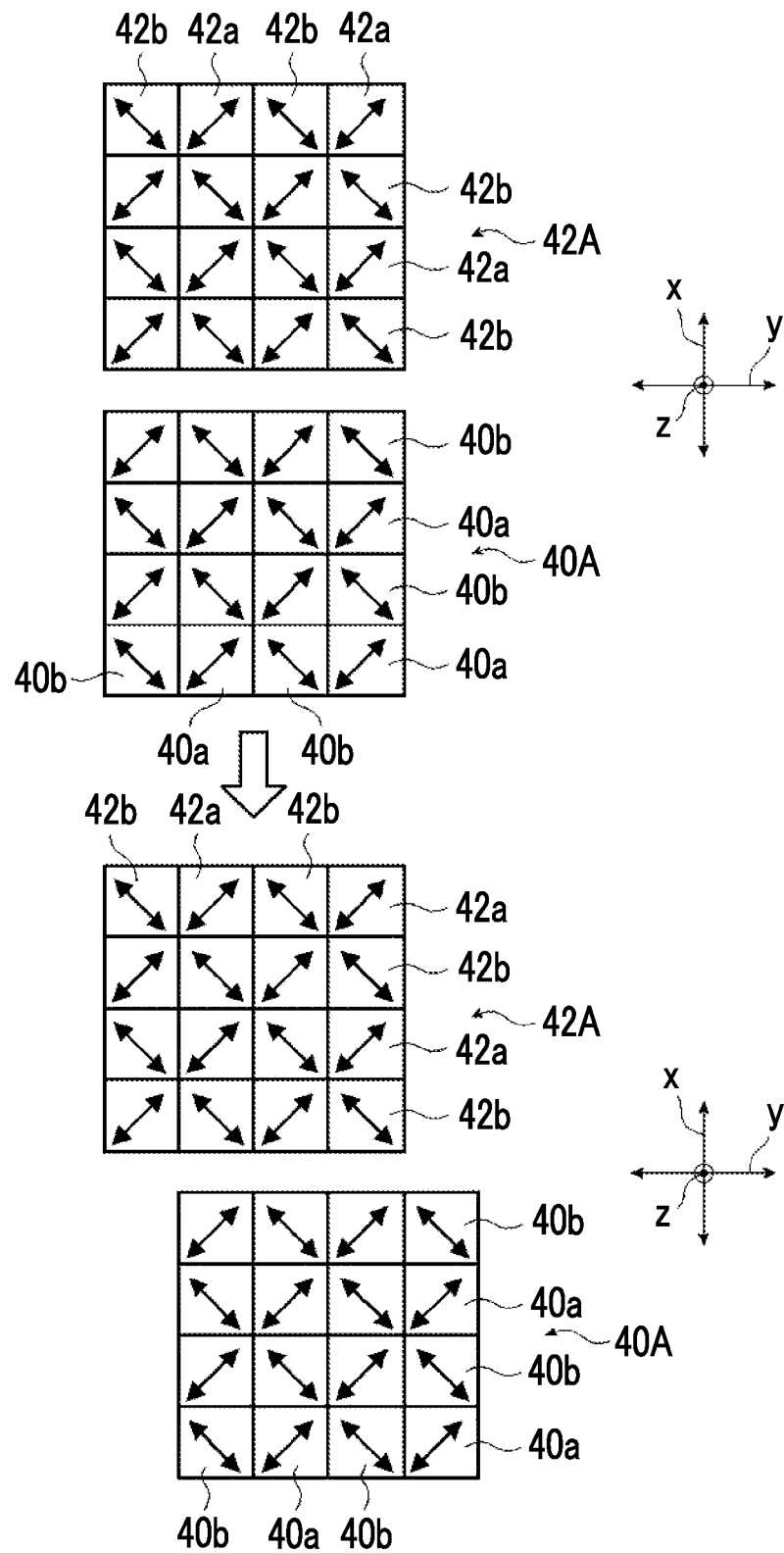
FIG. 9 is a view describing the action of the optical device according to the other embodiment.

In FIG. 7, and FIGS. 8 and 9 described below, the x direction, the y direction, and the z direction are basically the same as those in FIGS. 1 to 6.

Further, in the present invention, the rectangular shape includes a square shape.

The optical device 36 illustrated in FIG. 7 basically has the same configuration as the optical device 10 illustrated in FIG. 1 except that the functional layer 38 is formed of a first phase difference plate 40 and a second phase difference plate 42.

In the optical device 36, the first phase difference plate 40 is formed of a patterned optically-anisotropic layer 40A and a support 40B. Further, the second phase difference plate 42 is formed of a patterned optically-anisotropic layer 42A and a support 42B.

In FIG. 7, and FIGS. 8 and 9 described below, the arrows of the patterned optically-anisotropic layers indicate directions of (in-plane) slow axes of the patterned optically-anisotropic layers, that is, directions of slow axes in the x-y direction, similar to the case illustrated in FIG. 1.

In the first phase difference plate 40 and the second phase difference plate 42, the patterned optically-anisotropic layer 40A and the patterned optically-anisotropic layer 42A are the same as the patterned optically-anisotropic layer 18A described above except that the optically-anisotropic patterns are different from each other.

In the first phase difference plate 40 and the second phase difference plate 42, the support 40B and the support 42B are the same as the support 18B described above.

FIG. 8 is a perspective view schematically illustrating the patterned optically-anisotropic layer 40A of the first phase difference plate 40 and the patterned optically-anisotropic layer 42A of the second phase difference plate 42 of the optical device 36. In FIG. 8, the patterned optically-anisotropic layer 40A and the patterned optically-anisotropic layer 42A are shown in a plan view in order to simplify the drawing.

FIG. 9 is a top view schematically illustrating the patterned optically-anisotropic layer 40A of the first phase difference plate 40 and the patterned optically-anisotropic layer 42A of the second phase difference plate 42. In FIG. 9, the patterned optically-anisotropic layer 40A and the patterned optically-anisotropic layer 42A are shown in parallel with each other in the vertical direction in the figure in order to clarify the configuration and the action, but the positions of the patterned optically-anisotropic layer 40A and the patterned optically-anisotropic layer 42A in the x direction match each other.

In the optical device 10 described above, the patterned optically-anisotropic layer is divided into the first belt-like region and the second belt-like region which are elongated and have slow axes orthogonal to each other.

Meanwhile, in the optical device 36 illustrated in FIG. 7, as illustrated in FIGS. 7 to 9, the patterned optically-anisotropic layer 40A of the first phase difference plate 40 is divided into a plurality of lattice-like rectangular regions at equal intervals in the x direction and the y direction in the same plane. The patterned optically-anisotropic layer 40A has two first rectangular regions 40a and two second rectangular regions 40b alternately arranged in both of the x direction and the y direction and has a total of sixteen first rectangular regions 40a and two second rectangular regions 40b.

Similar to the example described above, the first phase difference plate 40 is a λ/4 plate, and the first rectangular region 40a and the second rectangular region 40b of the patterned optically-anisotropic layer 40A have a constant phase difference, but the directions of the slow axes are different from each other. Specifically, the first rectangular region 40a has a slow axis inclined by 45° with respect to the y direction and the second rectangular region 40b has a slow axis inclined by 135° with respect to the y direction.

In other words, the patterned optically-anisotropic layer 40A is a patterned optically-anisotropic layer divided in a square lattice form in which the first rectangular region 40a and the second rectangular region 40b which are two types of rectangular regions having slow axes orthogonal to each other are alternately formed in the x direction and the y direction.

Further, as illustrated in FIGS. 7 to 9, the second phase difference plate 42 of the optical device 36 is a λ/4 plate having the same configuration as that of the first phase difference plate 40.

In other words, the patterned optically-anisotropic layer 42A of the second phase difference plate 42 is divided in the lattice form having the same size as the patterned optically-anisotropic layer 40A in the x direction and the y direction. Further, the patterned optically-anisotropic layer 42A has two first rectangular regions 42a and two second rectangular regions 42b alternately arranged in both of the x direction and the y direction and has a total of sixteen first rectangular regions 42a and two second rectangular regions 42b. The first rectangular region 42a and the second rectangular region 42b have a constant phase difference, but the first rectangular region 42a has a slow axis inclined by 45° with respect to the y direction and the second rectangular region 42b has a slow axis inclined by 135° with respect to the y direction.

Therefore, the patterned optically-anisotropic layer 42A is also a patterned optically-anisotropic layer divided in a square lattice form in which the first rectangular region 42a and the second rectangular region 42b which are two types of rectangular regions having slow axes orthogonal to each other are alternately formed in the x direction and the y direction.

Further, the patterned optically-anisotropic layer 40A and the patterned optically-anisotropic layer 42A have rectangular regions divided into the lattice form in both of the x direction and the y direction. Accordingly, in the patterned optically-anisotropic layer 40A and the patterned optically-anisotropic layer 42A, the division directions of the regions in the lattice form match each other.

As described above, the optical device 36 is also used by being placed on display screens of various displays (display elements).

In a case where image display is performed at a typical wide viewing angle in a display device obtained by using the optical device 36 illustrated in FIG. 7, in the first phase difference plate 40 and the second phase difference plate 42, the first rectangular region 40a of the patterned optically-anisotropic layer 40A and the second rectangular region 42b of the patterned optically-anisotropic layer 42A match each other in the x-y direction and the second rectangular region 40b of the patterned optically-anisotropic layer 40A and the first rectangular region 42a of the patterned optically-anisotropic layer 42A match each other in the x-y direction as illustrated in the upper stage of FIGS. 8 and 9.

As described above, the first rectangular region 40a and the first rectangular region 42a are each a λ/4 plate having a slow axis at an angle of 45° with respect to the y direction, and the second rectangular region 40b and the second rectangular region 42b are each a λ/4 plate having a slow axis at an angle of 135° with respect to the y direction.

Accordingly, in this state, the regions are in a state in which two sheets of λ/4 plates having slow axes orthogonal to each other are laminated and the total in-plane retardation is 0, which is in a state of not functioning. Therefore, by the same action as the optical device 10 described above, an image is displayed at a typical wide viewing angle in a display device obtained by using the optical device 36 in this state.

On the contrary, in a case where an image is displayed at a narrow viewing angle, the first phase difference plate 40 is moved by the moving unit 24 in the y direction indicated by an arrow by a distance of one rectangular region as illustrated in FIGS. 8 and 9.

As described above, in the patterned optically-anisotropic layer 40A and the patterned optically-anisotropic layer 42A, rectangular regions which are divided in the lattice form and have the same size are arranged in the x-y direction. Accordingly, in a case where the first phase difference plate 40 is moved in the y direction indicated by an arrow by a distance of one rectangular region, the first rectangular region 40a of the patterned optically-anisotropic layer 40A and the first rectangular region 42a of the patterned optically-anisotropic layer 42A match each other in the x-y direction, and the second rectangular region 40b of the patterned optically-anisotropic layer 40A and the second rectangular region 42b of the patterned optically-anisotropic layer 42A match each other in the x-y direction.

As described above, the first rectangular region 40a and the first rectangular region 42a are each a λ/4 plate having a slow axis at an angle of 45° with respect to the y direction, and the second rectangular region 40b and the second rectangular region 42b are each a λ/4 plate having a slow axis at an angle of 135° with respect to the y direction.

Accordingly, in this state, the functional layer 38 formed of the first phase difference plate 40 and the second phase difference plate 42 is in a state in which two sheets of λ/4 plates having slow axes that match each other are laminated and the total in-plane retardation is λ/2. In other words, in this state, the functional layer 38 is in the same state of the λ/2 plate having a slow axis 14s at an angle of 45° with respect to the x direction and the y direction.

As the result, by the same action as the optical device 10 described above, in a display device obtained by using the optical device 36, light is blocked by the second polarizer 16 in a case where the display image is observed in the x direction and the y direction in this state, and the viewing angle is narrowed in both of the x direction and the y direction.

Further, image display is performed at a wide viewing angle again in a case where the state illustrated in the lower stage of FIGS. 8 and 9 is returned to the state illustrated in the upper stage of FIGS. 8 and 9 by allowing the moving unit 24 to move the first phase difference plate 40.

Accordingly, even in the optical device 36 illustrated in FIG. 7, it is possible to switch between image display at a typical wide viewing angle and image display at a narrow viewing angle obtained by narrowing the viewing angle vertically and horizontally, by employing a simple configuration of using two sheets of phase difference plates and polarizers and performing a simple operation of only moving a phase difference plate, similar to the case of the optical device 10 described above.

Further, in the optical device 36 illustrated in FIG. 7, the patterned optically-anisotropic layer is divided into rectangular regions in the square lattice form, but the present invention is not limited thereto.

In other words, the patterned optically-anisotropic layer 40A and the patterned optically-anisotropic layer 42A may be divided into rectangular regions in a rectangular shape in a case where the size of the rectangular regions in the x direction and the size of the rectangular regions in the y direction match each other.

In the example described above, the first phase difference plate on a side close to the display has been moved, but image display at a wide viewing angle and image display at a narrow viewing angle may be switched by moving the second phase difference plate on a side far from the display. Further, image display at a wide viewing angle and image display at a narrow viewing angle may be switched by moving both of the first phase difference plate and the second phase difference plate.

In other words, in the present invention, any phase difference plate may be moved as long as the first phase difference plate and the second phase difference plate can be moved relative to each other.

In the example described above, the moving unit 24 moves the first phase difference plate by the same amount as the width of the belt-like region or the size of the rectangular region, but the present invention is not limited thereto.

For example, the moving unit 24 moves by the odd number times such as three times or five times the width of the belt-like region or the size of the rectangular region so that switching between image display at a wide viewing angle and image display at a narrow viewing angle may be performed. Such a configuration is effective in a case where the movement accuracy of the first phase difference plate 18 moved by the moving unit 24 is low or a case where the movement minimum value of the first phase difference plate 18 moved by the moving unit 24 is large.

Alternatively, the moving unit 24 moves the first phase difference plate 18 by (m+0.5) times (m represents 0 or a positive integer) the width of the belt-like region, for example, 1.5 times the width of the belt-like region so that switching between image display at a wide viewing angle and image display at a narrow viewing angle may be performed. In this manner, the degree of a decrease in visibility at a narrow viewing angle can be reduced, for example, to about half.

In the optical device 10 and the optical device 36, the functional layer switches between the state in which the in-plane retardation of the functional layer 14 is 0 and the state in which the in-plane retardation is λ/2 by moving the phase difference plates using two sheets of phase difference plates respectively having a patterned optically-anisotropic layer, but the present invention is not limited thereto, and various configurations can be used as long as switching between the state in which the in-plane retardation of the functional layer is 0 and the state in which the in-plane retardation is λ/2 (greater than 0) can be performed.

For example, switching between the state in which the in-plane retardation of the functional layer is 0 and the state in which the in-plane retardation is λ/2 (greater than 0) may be performed by forming a functional layer using an in-plane switching (IPS) liquid crystal, a twisted nematic (TN) liquid crystal, a vertical alignment (VA) liquid crystal, an optically compensated bend (OCB) liquid crystal, or a blue mode liquid crystal to adjust the applied voltage.

Further, in the optical device 10 and the optical device 36, the functional layer switches between the state in which the in-plane retardation is 0 and the state in which the in-plane retardation is λ/2, but the present invention is not limited thereto.

For example, switching between the state in which the in-plane retardation of the functional layer is 0 and the state in which the in-plane retardation is greater than 0, for example, a state in which the in-plane retardation is λ/4, a state in which the in-plane retardation is λ/8, or a state in which the in-plane retardation is 5λ/8 may be performed by selecting the phase difference plate used for the functional layer, selecting the number of phase difference plates used for the functional layer, or adjusting the voltage applied to the liquid crystal layer.

Hereinbefore, the optical device and the display device according to the embodiment of the present invention have been described in detail, but the present invention is not limited to the examples described above and various improvements or modifications can be made within the range not departing from the scope of the present invention.

EXAMPLES

The features of the present invention will be described in detail with reference to the following examples. The materials, the reagents, the used amounts, the amounts of substances, the ratios, the treatment contents, and the treatment procedures described in the following examples can be appropriately changed within the range not departing from the gist of the present invention. Therefore, the range of the present invention should not be limitatively interpreted by the following specific examples.

Example

<Preparation of Triacetyl Cellulose Film>

Each of the following components was put into a mixing tank and stirred while being heated so as to be dissolved, thereby preparing a cellulose acetate solution.

(Composition of Cellulose Acetate Solution)

Cellulose acetate having acetylation degree of 60.7% to 61.1%: 100 parts by mass Triphenyl phosphate (plasticizer): 7.8 parts by mass Biphenyl diphenyl phosphate (plasticizer): 3.9 parts by mass Methylene chloride (first solvent): 336 parts by mass Methanol (second solvent): 29 parts by mass 1-Butanol (third solvent): 11 parts by mass 16 parts by mass of the following retardation enhancer (A), 92 parts by mass of methylene chloride, and 8 parts by mass of methanol were put into another mixing tank and stirred while being heated, thereby preparing a retardation enhancer solution.

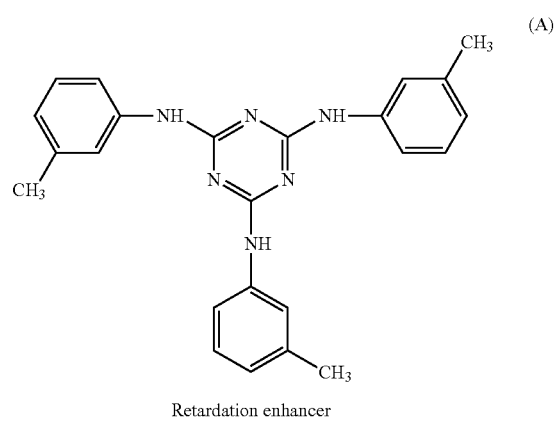 [SMILES: Cc1cccc(Nc2nc(Nc3cccc(C)c3)nc(Nc3cccc(C)c3)n2)c1]

Retardation enhancer 25 parts by mass of the retardation enhancer solution was mixed with 474 parts by mass of the cellulose acetate solution, and the resulting solution was sufficiently stirred to prepare a dope. The amount of the retardation enhancer (A) to be added was 6 parts by mass with respect to 100 parts by mass of cellulose acetate.

The obtained dope was cast using a band stretching machine. After the film surface temperature of the film on the band reached 40° C., the film was dried with hot air at 70° C. for 1 minute. Further, the film was dried with dry air at 140° C. for 10 minutes, thereby preparing a triacetyl cellulose film (hereinafter, also referred to as a TAC film) having a residual solvent amount of 0.3% by mass.

<Preparation of Composition for Photoalignment Film>

<<Polymer>>

100 parts by mass of 2-(3,4-epoxycyclohexyl)ethyltrimethoxysilane, 500 parts by mass of methyl isobutyl ketone, and 10 parts by mass of triethylamine were put into a reaction container comprising a stirrer, a thermometer, a dropping funnel, and a reflux cooling pipe and mixed at room temperature.

Next, 100 parts by mass of deionized water was added dropwise to a solution in the reaction container for 30 minutes using the dropping funnel, and the obtained solution was allowed to react at 80° C. for 6 hours while being mixed under reflux. After the reaction was completed, an organic phase was taken out from the solution, and the organic phase was washed with a 0.2 mass % ammonium nitrate aqueous solution. The washing was repeatedly performed until the water phase became neutral. Thereafter, the solvent and water were distilled off under reduced pressure, thereby obtaining epoxy group-containing polyorganosiloxane as a viscous transparent liquid.

As the result of $^1$H-NMR (nuclear magnetic resonance) analysis performed on this epoxy group-containing polyorganosiloxane, it was confirmed that a peak based on an oxiranyl group was obtained in the vicinity of the chemical shift (δ) of 3.2 ppm according to the theoretical strength and a side reaction of the epoxy group did not occur during the reaction. The weight-average molecular weight Mw of this epoxy group-containing polyorganosiloxane was 2200 and the epoxy equivalent was 186 g/mol.

Next, 10.1 parts by mass of the epoxy group-containing polyorganosiloxane obtained in the above-described manner, acrylic group-containing carboxylic acid ("ARONIX M-5300"™, manufactured by Toagosei Company, Ltd.), 0.5 parts by mass of acrylic acid ω-carboxypolycaprolactone (degree of polymerization n≈2), 20 parts by mass of butyl acetate, 1.5 parts by mass of formic acid derivative obtained according to the method in Synthesis Example 1 of JP2015-026050A, and 0.3 parts by mass of tetrabutyl ammonium bromide were put into a 100 mL three-neck flask, and the obtained reaction solution was stirred at 90° C. for 12 hours.

After the reaction was completed, the reaction solution was diluted with the same amount (mass) of butyl acetate as the amount of the reaction solution and washed with water three times.

The operation of concentrating the obtained solution and diluting the solution with butyl acetate was repeated two times to finally obtain a solution containing polyorganosiloxane (polymer) that contains a photo-aligned group. The weight-average molecular weight Mw of this polymer was 9000. Further, as the result of $^1$H-NMR analysis, the amount of the component containing a cinnamate group in the polymer was 23.7% by mass.

<<Composition for Photoalignment Film>>

A polymer which had been prepared in advance, and the following amounts of the compounds D1 and D2 were added using butyl acetate as a solvent, thereby preparing a composition for a photoalignment film.

(Composition for Photoalignment Film)
Butyl acetate: 100 parts by mass
Polymer: 4.35 parts by mass
Compound D1: 0.48 parts by mass
Compound D2: 1.15 parts by mass

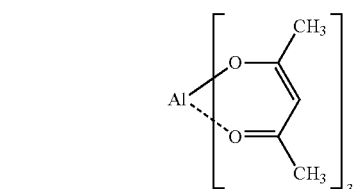

D1

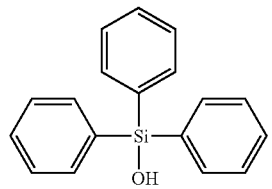

D2

<Preparation of Coating Solution 1 for Patterned Optically-Anisotropic Layer>

A coating solution 1 for a patterned optically-anisotropic layer with the following composition was prepared.

(Coating Solution 1 for Patterned Optically-Anisotropic Layer)
Methoxy ethyl acrylate: 533.68 parts by mass
Mixture of rod-like liquid crystal compounds shown below: 100 parts by mass
Monomer shown below: 5 parts by mass
Polymerization initiator shown below: 6 parts by mass
Surfactant shown below: 0.25 parts by mass
Mixture of rod-like liquid crystal compounds

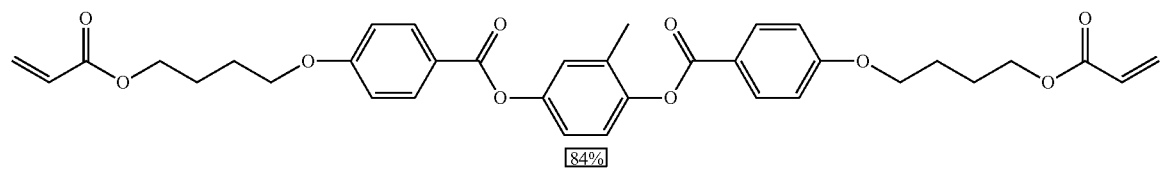

84%

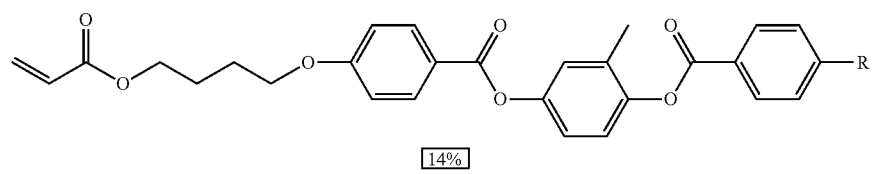

14%

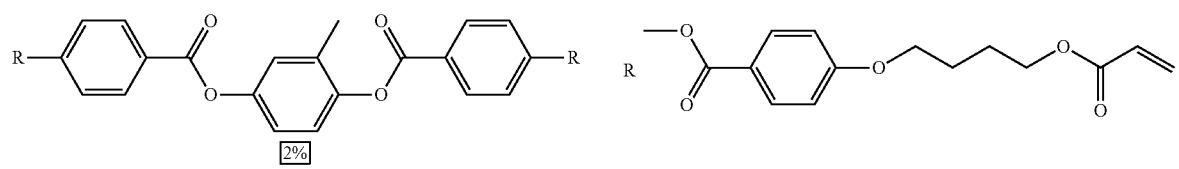

2%

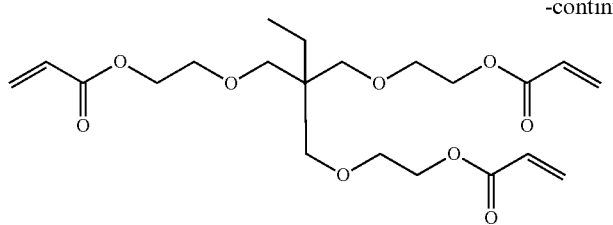

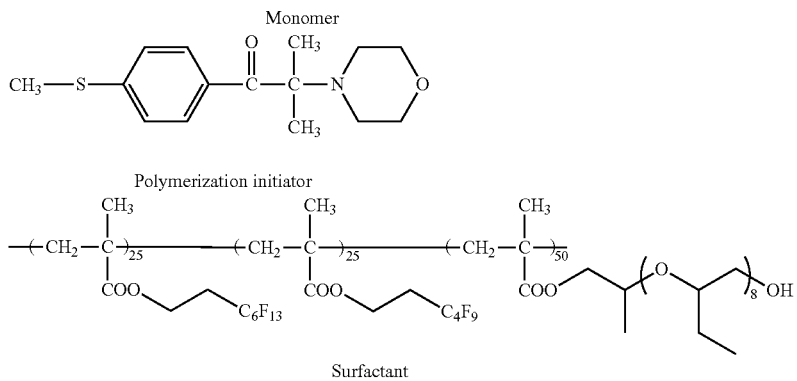

Surfactant

<Formation of Photoisomerizable Composition Layer>

The TAC film prepared in advance was coated with the composition for a photoalignment film prepared in advance using a #2.0 bar coater. Thereafter, the support coated with the composition for a photoalignment film was dried on a hot plate at 100° C. for 5 minutes so that the solvent was removed, thereby forming a photoisomerizable composition layer having a thickness of 0.2 μm.

<Formation of Photoalignment Film>

A photoalignment film was prepared in the following manner using a movable stage (ALS-305-CM, manufactured by Central Motor Wheel Co., Ltd.), a rotary stage (SGSP-60YAW-OB, manufactured by Sigma Koki Co., Ltd.), a light screen, a wire grid polarizing plate (product code: #46-636, manufactured by Edmond), and an ultraviolet irradiation device (EX250-W, manufactured by HOYA-SCOTT Corporation).

Figure 4:
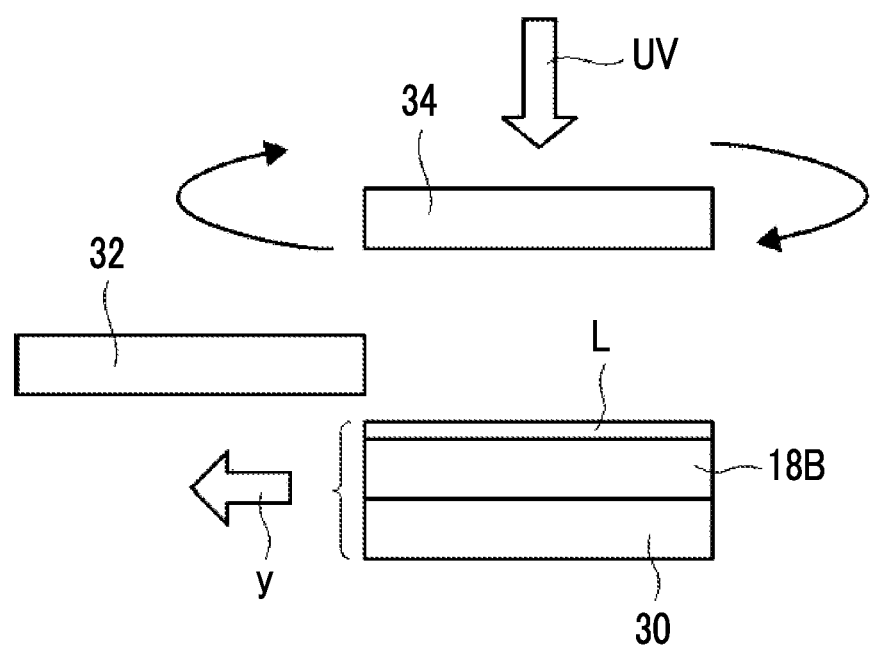
FIG. 4 is a view illustrating an embodiment of a method of producing a phase difference plate.

As conceptually illustrated in FIG. 4, the prepared TAC film provided with a photoisomerizable composition layer was placed on a movable stage, and a light screen was disposed by being immobilized on the movable stage. The light screen was provided such that the edges of the light screen and the TAC film were allowed to match each other and the TAC film was not covered by the light screen. In this manner, during the movement of the movable stage to the side of the light screen, the photoisomerizable composition layer of the TAC film was hidden below the light screen by the movement amount.

Further, the rotary stage was disposed by being immobilized on the movable stage, the wire grid polarizing plate was placed on the rotary stage so as to be rotatable. The polarizing axis of the wire grid polarizing plate was allowed to match the movement direction of the movable stage.

30 mJ/cm$^2$ of ultraviolet rays were applied through the wire grid polarizing plate. Thereafter, the movable stage was allowed to move by a distance of 10 mm, and the wire grid polarizing plate was allowed to rotate by 90°. Next, similarly, ultraviolet rays were applied. Subsequently, the movement of the movable stage by a distance of 10 mm, the rotation of the polarizing plate by 90°, and the irradiation with ultraviolet rays were repeated until the total operation distance of the movable stage reached 200 mm, thereby forming a photoalignment film on the TAC film.

<Preparation of Phase Difference Plate (λ/4 Plate) (Formation of Patterned Optically-Anisotropic Layer)>

The photoalignment film formed in the above-described manner was coated with the coating solution 1 for a patterned optically-anisotropic layer prepared in advance using a #2.4 bar coater.

Thereafter, the support coated with the coating solution 1 for a patterned optically-anisotropic layer was dried on a hot plate at 90° C. for 2 minutes to form a layer having a composition which becomes a patterned optically-anisotropic layer. Next, the temperature thereof was held at 60° C., the layer was irradiated (500 mJ/cm$^2$) with ultraviolet rays, the alignment thereof was fixed to form a patterned optically-anisotropic layer having a film thickness of 1 μm, thereby preparing each phase difference plate using a TAC film as a support. Two sheets of the above-described phase difference plates were prepared to be used as a first phase difference plate and a second phase difference plate.

The first phase difference plate and the second phase difference plate each have first belt-like regions having a slow axis at an angle of 45° with respect to the y direction and second belt-like regions having a slow axis at an angle of 135° with respect to the y direction, which are alternately formed, and have a total of twenty belt-like regions.

<Confirmation of Patterned Optically-Anisotropic Layer>

The patterned optically-anisotropic layer of the prepared phase difference plate was observed using a polarizing microscope (ECLIPSE E600-POL).

As the result, as illustrated in FIG. 1, it was confirmed that the belt-like regions each having a width of 10 mm, in which the directions of the slow axes were alternately different by 90°, were continuously and repeatedly formed in a direction orthogonal to the longitudinal direction, on the patterned optically-anisotropic layer.

<Measurement of Front Phase Difference>

A photoalignment film was formed in the same manner as the formation of the photoalignment film except that a photoisomerizable composition layer having a thickness of 0.2 μm which becomes a photoalignment film was formed on the support, and this photoisomerizable composition layer was irradiated (30 mJ/cm$^2$) with ultraviolet rays once without rotating the wire grid polarizing plate.

Thereafter, similar to the formation of the patterned optically-anisotropic layer, the photoalignment film was coated with the coating solution 1 for a patterned optically-anisotropic layer, dried, and cured with ultraviolet rays to prepare a phase difference plate for measuring the front phase difference, including a patterned optically-anisotropic layer with a film thickness of 1 μm.

The front phase difference of the phase difference plate was measured using Axometry (manufactured by Axometrics, Inc.). As the result, the front phase difference (in-plane retardation) of the phase difference plate was 138 nm.

<Preparation of First Polarizer and Second Polarizer>

1.11 parts by mass of an initiator solution [a solution obtained by dissolving 0.90 parts by mass of IRGACURE 907 (manufactured by Ciba Specialty Chemicals, Inc.) and 0.30 parts by mass of KAYACURE DETX (manufactured by Nippon Kayaku Co., Ltd.) in 8.80 parts by mass of methyl ethyl ketone (MEK)] was added to a liquid crystal solution obtained by dissolving 3.04 parts by mass of a liquid crystal compound (PALIOCOLOR LC242 (trade name), manufactured by BASF SE) containing a photopolymerizable group and 0.1 parts by mass of a polymeric surfactant (MEGAFACE F780F, manufactured by DIC Corporation) in 5.07 parts by mass of methyl ethyl ketone (MEK), and the solution was stirred for 5 minutes for complete dissolution.

Next, 0.023 parts by mass of a dichroic azo coloring agent G241 (manufactured by HAYASHIBARA CO., LTD.) and 0.005 parts by mass of a dichroic azo coloring agent G472 (manufactured by HAYASHIBARA CO., LTD.) were added to the obtained solution and subjected to ultrasonic dispersion for 5 minutes, thereby preparing a polarizing film coating solution.

<Formation of Acrylic Layer>

Each of the following components was put into a mixing tank and stirred to be mixed, and the mixture was filtered using a polypropylene filter having a pore diameter of 0.4 μm, thereby preparing a composition for forming an acrylic layer.

<<Composition for Forming Acrylic Layer>>

Compound A: 70 parts by mass
Compound B: 30 parts by mass
Isopropyl alcohol: 425 parts by mass
Methyl acetate: 142 parts by mass Compound A: KAYARAD PET 30: manufactured by Nippon Kayaku Co., Ltd., a mixture of a compound with the following structure, the mass average molecular weight is 298, and the number of functional groups in one molecule is 3.4 (average).

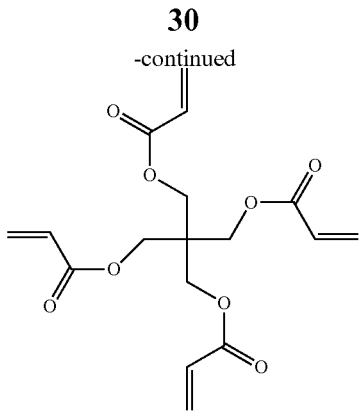

-continued

Compound B: BLEMMER GLM: manufactured by NOF CORPORATION, a compound with the following structure

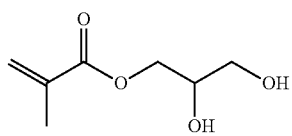

4% by mass of a photopolymerization initiator (IRGACURE 127, manufactured by BASF SE) was added to the prepared composition for forming an acrylic layer with respect to the solid content in the composition for forming an acrylic layer.

Next, the TAC film prepared in the above-described manner was coated with the composition for forming an acrylic layer obtained by adding a photopolymerization initiator using a gravure coater to form a coating layer. Thereafter, the coating layer was dried at 100° C. and cured by being irradiated with ultraviolet rays to form an acrylic layer on the TAC film. The irradiation with ultraviolet rays was carried out under conditions of an illuminance of 400 mW/cm$^2$ and an irradiation dose of 150 mJ/cm$^2$ using an air-cooled metal halide lamp (manufactured by EYE GRAPHICS CO., LTD.) having an intensity of 160 W/cm while nitrogen purging such that the oxygen concentration was set to 1.0% by volume or less. The film thickness of the acrylic layer was 0.3 μm. This acrylic layer is formed into a vertical alignment film in each of the first polarizer 12 and the second polarizer 16.

The acrylic layer of the TAC film used to form an acrylic layer was coated with the prepared polarizing film coating solution using a bar coater such that the coating amount thereof was set to 4 ml/m$^2$.

The TAC film after the coating was heated at a maturing temperature of 180° C. for 120 seconds and irradiated with ultraviolet rays while the temperature was maintained at 25° C., and the crosslinking reaction was promoted. The irradiation with ultraviolet rays was performed under conditions of an illuminance of 50 mW/cm$^2$ and an irradiation dose of 300 mJ/cm$^2$ using a mercury xenon lamp as an ultraviolet irradiation device. In this manner, an optical film was obtained, and two sheets of the above-described optical films were prepared to be used as a first polarizer and a second polarizer.

<Evaluation>

An iPad®, manufactured by Apple Inc.) was used as a display. The first polarizer, the first phase difference plate, the second phase difference plate, and the second polarizer were placed on the display screen of this display in this order.

The optical device was placed on the display screen of the display by matching the vertical direction of the image display in the display with the longitudinal direction (x direction) of the belt-like regions of the first phase difference plate and the second phase difference plate and matching the horizontal direction of the image display in the display with the arrangement direction (y direction) of the belt-like regions of the first phase difference plate and the second phase difference plate.

Further, the first phase difference plate and the second phase difference plate were in a state in which the first belt-like region of the first phase difference plate and the second belt-like region of the second phase difference plate matched with the y direction and the second belt-like region of the first phase difference plate and the first belt-like region of the second phase difference plate matched with the y direction.

The image displayed on the display was observed in this state, and the image was able to be properly observed even in a case where the image was observed obliquely in any direction, similar to typical display using a display.

Next, the first phase difference plate was moved by an amount (10 mm) of the width of the belt-like regions in the arrangement direction (the y direction=the horizontal direction) of the belt-like regions.

The image displayed on the display was observed in this state, and the image displayed on the display was not able to be seen at the time of being obliquely observed in the vertical direction (the x direction of FIG. 2) and the horizontal direction (the y direction of FIG. 2).

As shown in the results described above, the effects of the present invention are evident.

The present invention can be suitably applied to tablet PCs, notebook PCs, smartphones, and the like.

EXPLANATION OF REFERENCES 10, 36: optical device
12: first polarizer
14, 38: functional layer
16: second polarizer
18, 40: first phase difference plate
18A, 20A, 40A, 42A: patterned optically-anisotropic layer
18B, 20B, 40B, 42B: support
18a, 20a: first belt-like region
18b, 20b: second belt-like region
20, 42: second phase difference plate
30: movable stage
32: light screen
34: linearly polarizing plate
40a, 42a: first rectangular region
40b, 42b: second rectangular region
Xp, Yp: polarizing plate
a: absorption axis
tx, ty: transmission axis

What is claimed is:

1. An optical device comprising:
   a first polarizer which has an absorption axis in a thickness direction;
   a second polarizer which has an absorption axis in a thickness direction; and
   a functional layer which is disposed between the first polarizer and the second polarizer and is capable of switching between a state in which an in-plane retardation is 0 and a state in which the in-plane retardation is greater than 0.

2. The optical device according to claim 1,
   wherein the functional layer switches between a state in which the in-plane retardation is 0 and a state in which the in-plane retardation is $\lambda/2$.

3. The optical device according to claim 1, further comprising:
   a moving unit,
   wherein the functional layer includes a first phase difference plate and a second phase difference plate which each include a patterned optically-anisotropic layer having a constant phase difference and divided into a plurality of belt-like regions in the same plane, and are disposed such that longitudinal directions of the belt-like regions match each other,
   directions of slow axes in one belt-like region match each other and directions of slow axes of belt-like regions adjacent to each other are different from each other in each of the patterned optically-anisotropic layer of the first phase difference plate and the patterned optically-anisotropic layer of the second phase difference plate, and
   the moving unit moves the first phase difference plate and the second phase difference plate relative to each other in arrangement directions of the belt-like regions.

4. The optical device according to claim 3,
   wherein the patterned optically-anisotropic layer of the first phase difference plate and the patterned optically-anisotropic layer of the second phase difference plate have an inverse wavelength dispersion property.

5. The optical device according to claim 3,
   wherein the patterned optically-anisotropic layer of the first phase difference plate and the patterned optically-anisotropic layer of the second phase difference plate contain a rod-like liquid crystal compound or a discotic liquid crystal compound.

6. The optical device according to claim 3,
   wherein, in each of the patterned optically-anisotropic layer of the first phase difference plate and the patterned optically-anisotropic layer of the second phase difference plate, the slow axes of the belt-like regions adjacent to each other are orthogonal to each other.

7. The optical device according to claim 3,
   wherein the first phase difference plate and the second phase difference plate are $\lambda/4$ plates.

8. The optical device according to claim 1, further comprising:
   moving unit,
   wherein the functional layer includes a first phase difference plate and a second phase difference plate which each include a patterned optically-anisotropic layer having a constant phase difference and divided into a plurality of lattice-like rectangular regions in the same plane, and are disposed such that lattice-like division directions match each other,
   directions of slow axes in one rectangular region match each other and directions of slow axes of the rectangular regions adjacent to each other in the lattice-like division directions are different from each other in each of the patterned optically-anisotropic layer of the first phase difference plate and the patterned optically-anisotropic layer of the second phase difference plate, and
   the moving unit moves the first phase difference plate and the second phase difference plate relative to each other in one direction of the lattice-like division directions.

9. The optical device according to claim 8,
wherein, in each of the patterned optically-anisotropic layer of the first phase difference plate and the patterned optically-anisotropic layer of the second phase difference plate, the slow axes of the rectangular regions adjacent to each other in the lattice-like division directions are orthogonal to each other.

10. The optical device according to claim 8,
wherein the first phase difference plate and the second phase difference plate are λ/4 plates.

11. The optical device according to claim 8,
wherein the patterned optically-anisotropic layer of the first phase difference plate and the patterned optically-anisotropic layer of the second phase difference plate contain a rod-like liquid crystal compound or a discotic liquid crystal compound.

12. The optical device according to claim 8,
wherein the patterned optically-anisotropic layer of the first phase difference plate and the patterned optically-anisotropic layer of the second phase difference plate have an inverse wavelength dispersion property.

13. The optical device according to claim 1,
wherein the first polarizer and the second polarizer have a structure in which a birefringent material is aligned in the thickness direction.

14. The optical device according to claim 13,
wherein the birefringent material is a dichroic coloring agent.

15. A display device comprising:
a display element; and
the optical device according to claim 1.

* * * * *